US012706049B2

(12) United States Patent
Ku et al.

(10) Patent No.: US 12,706,049 B2
(45) Date of Patent: Aug. 11, 2026

(54) DISPLAY DEVICE AND METHOD OF DRIVING SAME

(71) Applicant: LG Display Co., Ltd., Seoul (KR)

(72) Inventors: Gun Hee Ku, Paju-si (KR); Jai Youn Song, Paju-si (KR); Yong Hyeon Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/233,739

(22) Filed: Jun. 10, 2025

(65) Prior Publication Data

US 2025/0391364 A1 Dec. 25, 2025

(30) Foreign Application Priority Data

Jun. 19, 2024 (KR) ........................ 10-2024-0079737

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2320/0233* (2013.01); *G09G 2320/041* (2013.01)

(58) Field of Classification Search
CPC ........... G09G 3/3233; G09G 2300/043; G09G 2300/0819; G09G 2320/0233; G09G 2320/041
USPC .......................................................... 345/204
See application file for complete search history.

(56) References Cited

U.S. PATENT DOCUMENTS

| | | | | |
|---|---|---|---|---|
| 11,087,685 | B1 * | 8/2021 | Lu | G09G 3/3233 |
| 2017/0092199 | A1 * | 3/2017 | Park | G09G 3/3258 |
| 2023/0197000 | A1 * | 6/2023 | Jo | G09G 3/3233 345/690 |
| 2023/0215354 | A1 * | 7/2023 | Bae | G09G 3/3233 345/690 |

FOREIGN PATENT DOCUMENTS

| | | | |
|---|---|---|---|
| KR | 20130056497 | A | 5/2013 |
| KR | 20140017738 | A | 2/2014 |
| KR | 20150069288 | A | 6/2015 |
| KR | 20150142116 | A | 12/2015 |
| KR | 20160049586 | A | 5/2016 |

* cited by examiner

*Primary Examiner* — Nathan P Brittingham
(74) *Attorney, Agent, or Firm* — Seed Intellectual Property Law Group LLP

(57) ABSTRACT

Disclosed is a display device including a display panel including subpixels, and a driver configured to drive the display panel, wherein each of the subpixels includes a light-emitting diode, a driving transistor configured to generate a driving current, a compensation capacitor configured to store a first sampled value of the driving transistor for a first period of time based on a high-level voltage and a reference voltage, a capacitor configured to store a second sampled value of the driving transistor for a second period of time based on the high-level voltage and the reference voltage, and a compensation transistor configured to sum the first sampled value stored in the compensation capacitor and the second sampled value stored in the capacitor.

12 Claims, 24 Drawing Sheets

DISPLAY DEVICE AND METHOD OF DRIVING SAME

CROSS-REFERENCE TO RELATED APPLICATION(S)

This application claims the benefit of Korean Patent Application No. 10-2024-0079737, filed on Jun. 19, 2024, which is hereby incorporated by reference as if fully set forth herein.

BACKGROUND

Technical Field

The present disclosure relates to a display device and a method of driving the same.

Description of the Related Art

As information technology develops, the market for display devices serving as connecting media between users and information, is growing. Accordingly, the use of display devices such as light emitting display (LED) devices, quantum dot display (QDD) devices, and liquid crystal display (LCD) devices is increasing.

The display devices described above include a display panel including subpixels, a driver that outputs a driving signal to drive the display panel, and a power supply that generates power to be supplied to the display panel or the driver.

The display devices described above can display images by allowing selected subpixels to transmit light or directly emit light when driving signals, such as a gate signal and a data signal, are supplied to the subpixels formed on the display panel.

BRIEF SUMMARY

Accordingly, the present disclosure is directed to a display device and a method of driving the same that substantially obviate one or more problems due to limitations and disadvantages of the related art.

The present disclosure improves display quality and enhances operation reliability and stability by improving TLS influence caused by the mobility of a driving transistor.

The present disclosure improves or reduces mobility variation in driving transistors due to temperature fluctuation in a display panel and variation in luminance caused by the mobility variation.

Additional advantages, characteristics, and features of the present disclosure will be set forth in part in the description which follows and in part will become apparent to those having ordinary skill in the art upon examination of the following or may be learned from practice of the present disclosure. The features and other advantages of the present disclosure may be realized and attained by the structure particularly pointed out in the written description and claims hereof as well as the appended drawings.

As embodied and broadly described herein, a display device includes a display panel including subpixels for displaying an image, and a driver configured to drive the display panel, wherein each of the subpixels includes a light-emitting diode configured to emit light, a driving transistor configured to generate a driving current to be supplied to the light-emitting diode, a compensation capacitor configured to store a first sampled value of the driving transistor for a first period of time based on a high-level voltage and a reference voltage, a capacitor configured to store a second sampled value of the driving transistor for a second period of time based on the high-level voltage and the reference voltage, and a compensation transistor configured to sum the first sampled value stored in the compensation capacitor and the second sampled value stored in the capacitor.

The first period of time may be shorter than the second period of time.

The first sampled value may include a mobility of the driving transistor, and the second sampled value may include a threshold voltage of the driving transistor.

The compensation capacitor may have a smaller capacitance than the capacitor.

A capacitance ratio of the capacitor and the compensation capacitor may be in the range of 1:0.05 to 1:0.3.

The subpixel may be defined by a data line through which a data voltage is transmitted, a reference voltage line through which the reference voltage is transmitted, an initialization voltage line through which an initialization voltage is transmitted, a high-level voltage line through which the high-level voltage is transmitted, and a low-level voltage line through which a low-level voltage is transmitted.

The subpixel may include a first switching transistor having a gate electrode connected to a first scan line, a first electrode connected to a first data line, and a second electrode connected to a gate node of the driving transistor, a second switching transistor having a gate electrode connected to a second scan line, a first electrode connected to the reference voltage line, and a second electrode connected to the gate node of the driving transistor, a third switching transistor having a gate electrode connected to a third scan line, and a first electrode connected to the initialization voltage line, the compensation transistor having a gate electrode connected to a fourth scan line, a first electrode connected to a second electrode of the compensation capacitor, and a second electrode connected to a source node of the driving transistor, a first control transistor having a gate electrode connected to a first control line, a first electrode connected to the high-level voltage line, and a second electrode connected to a drain node of the driving transistor, a second control transistor having a gate electrode connected to a second control line, a first electrode connected to the source node of the driving transistor, and a second electrode connected to an anode of the light-emitting diode, the capacitor having a first electrode connected to the second electrode of the first switching transistor, the second electrode of the second switching transistor, the gate node of the driving transistor, and a first electrode of the compensation capacitor, and a second electrode connected to the source node of the driving transistor, and the compensation capacitor having the first electrode connected to the second electrode of the second switching transistor, the gate node of the driving transistor, and the first electrode of the capacitor, and the second electrode connected to the first electrode of the compensation transistor.

In another aspect of the present disclosure, a method of driving a display device includes a first initialization step of initializing a gate node and a source node of a driving transistor based on a reference voltage and an initialization voltage, a first sampling step of storing a first sampled value of the driving transistor in a compensation capacitor for a first period of time based on a high-level voltage and the reference voltage, a second initialization step of initializing the gate node and the source node of the driving transistor based on the reference voltage and the initialization voltage, a second sampling step of storing a second sampled value of the driving transistor in a capacitor for a second period of time based on he high-level voltage and the reference voltage, a data write step of summing the first sampled value stored in the compensation capacitor and the second sampled value stored in the capacitor and storing a data voltage in the capacitor, a reset step of initializing the source node of the driving transistor and an anode of a light-emitting diode based on the initialization voltage, and an emission step of causing the light-emitting diode to emit light based on a driving current generated from the driving transistor.

The first sampling step may be shorter than the second sampling step.

The first sampled value may include a mobility of the driving transistor, and the second sampled value may include a threshold voltage of the driving transistor.

The compensation capacitor may have a smaller capacitance than the capacitor.

A capacitance ratio of the capacitor and the compensation capacitor may be in the range of 1:0.05 to 1:0.3.

It is to be understood that both the foregoing general description and the following detailed description of the present disclosure are exemplary and explanatory and are intended to provide further explanation of the present disclosure as claimed.

BRIEF DESCRIPTION OF THE SEVERAL VIEWS OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

A display device according to the present disclosure may be implemented as a television, a video player, a personal computer (PC), a home theater, an automobile electrical device, a smartphone, or the like, but the present disclosure is not limited thereto. The display device according to the present disclosure may be implemented as a light emitting display (LED) device, a quantum dot display (QDD) device, a liquid crystal display (LCD) device, or the like. However, for convenience of description, a light emitting display device that directly emits light based on inorganic light-emitting diodes or organic light-emitting diodes is used as an example of the display device.

In addition, a transistor which will be described below may be implemented as an n-type transistor, a p-type transistor, or a form including both n-type and p-type transistors. The transistor is a three-electrode element including a gate, a source, and a drain. The source is an electrode that supplies carriers to the transistor. In the transistor, carriers start to flow from the source. The drain is an electrode through which carriers leave the transistor. In other words, carriers flow from the source to the drain in the transistor.

In the case of a p-type transistor, holes serve as carriers, and thus a source voltage is higher than a drain voltage such that the holes can flow from the source to the drain. Since the holes flow from the source to the drain in the p-type transistor, the current flows from the source to the drain. In contrast, in the case of an n-type transistor, electrons serve as carriers, and thus the source voltage is lower than the drain voltage such that the electrons can flow from the source to the drain. Since the electrons flow from the source to the drain in the n-type transistor, the current flows from the drain to the source. However, the source and drain of a transistor can be changed depending on the applied voltage. To reflect this, in the following description, one of the source and drain is described as a first electrode, and the other of the source and drain is described as a second electrode.

Figure 1:
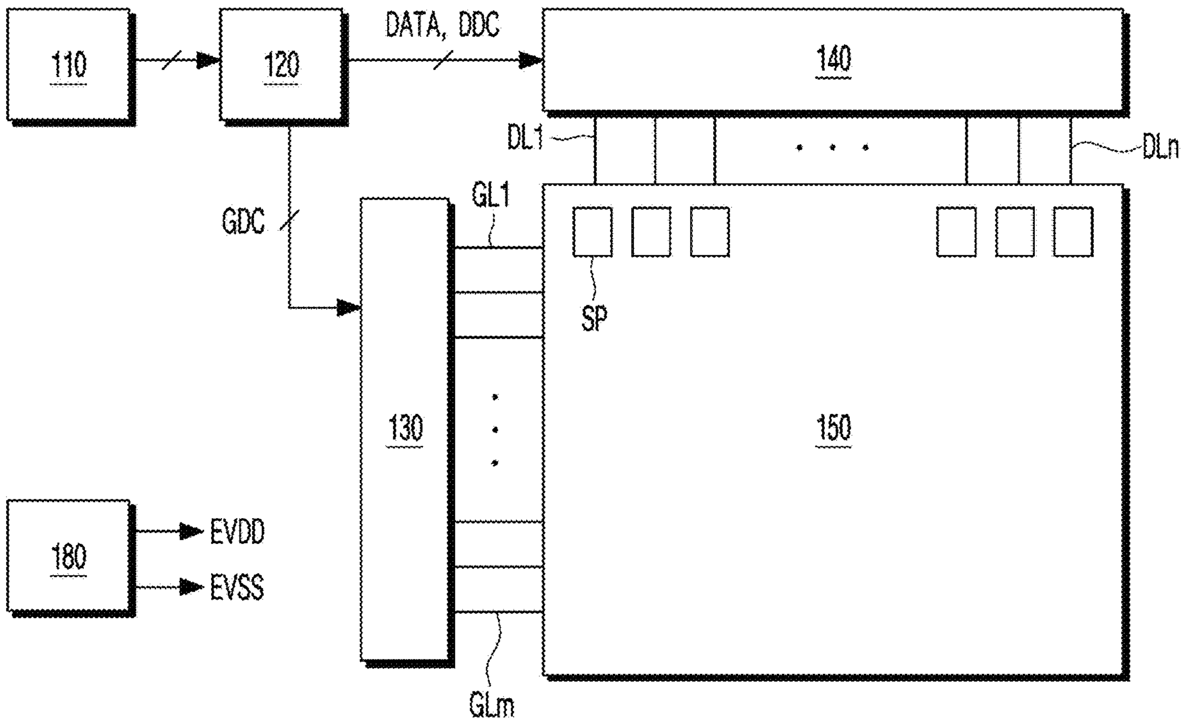
FIG. 1 is a block diagram schematically showing a light-emitting display device.
Figure 2:
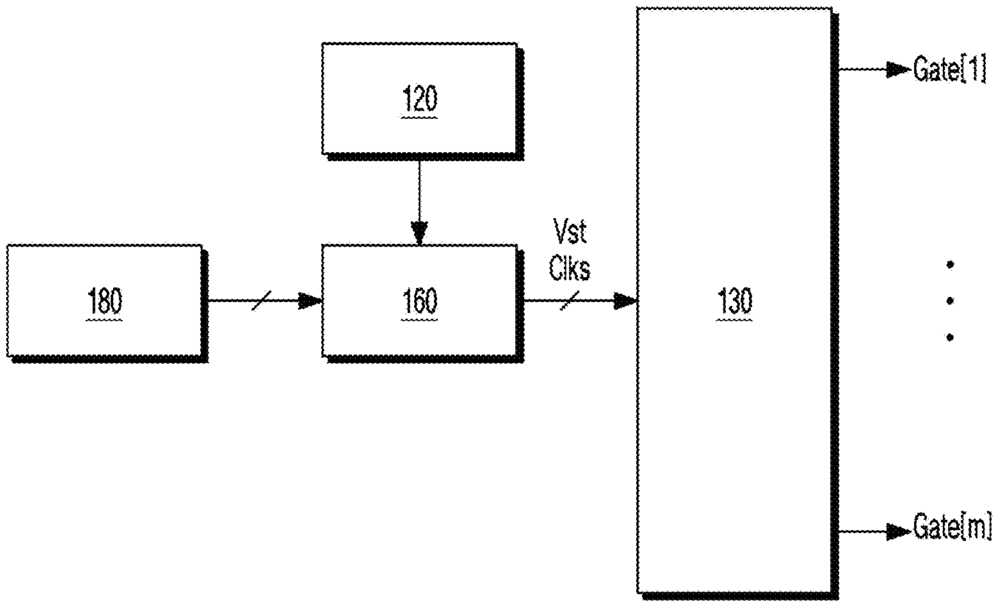
FIG. 2 and FIG. 3 are diagrams illustrating a configuration of a gate-in-panel type gate driver.
Figure 3:
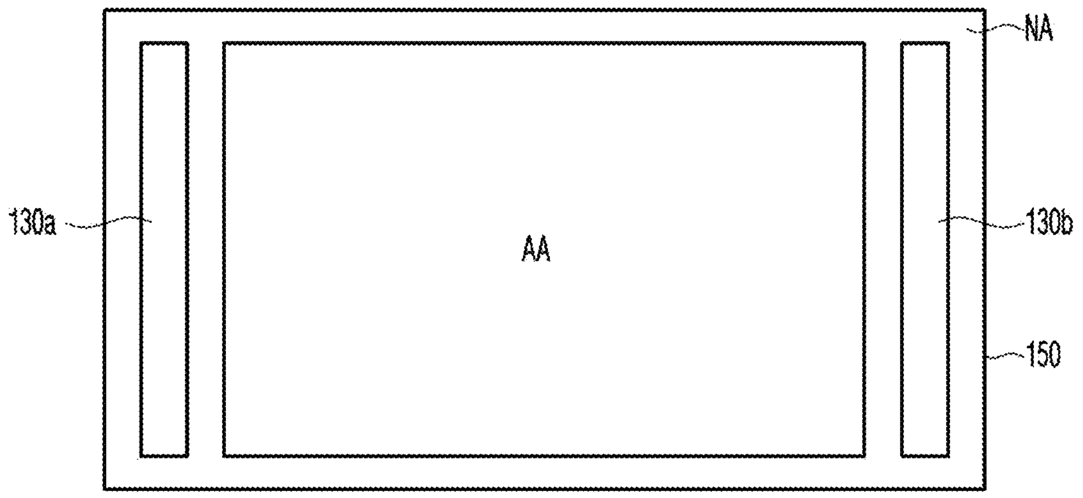

FIG. 1 is a block diagram schematically showing a light-emitting display device, and FIG. 2 and FIG. 3 are diagrams illustrating a configuration of a gate-in-panel type gate driver.

As illustrated in FIG. 1 to FIG. 3, the light-emitting display device may include a timing controller 120, a gate driver 130, a data driver 140, a display panel 150, and a power supply 180.

An image provider (set or host system) 110 may output various driving signals in addition to an image data signal supplied from the outside or an image data signal stored in an internal memory. The image provider 110 may supply a data signal and various driving signals to the timing controller 120.

The timing controller 120 may output a gate timing control signal GDC for controlling the operation timing of the gate driver 130, a data timing control signal DDC for controlling the operation timing of the data driver 140, and various synchronization signals (a vertical synchronization signal Vsync and a horizontal synchronization signal Hsync), etc. The timing controller 120 may supply a data signal DATA supplied from the image provider 110 along with the data timing control signal DDC to the data driver 140. The timing controller 120 may take the form of an integrated circuit (IC) and be mounted on a printed circuit board, but the present disclosure is not limited thereto.

The gate driver 130 may output a gate signal (or a gate voltage) in response to the gate timing control signal GDC supplied from the timing controller 120. The gate driver 130 may supply gate signals to subpixels included in the display panel 150 through gate lines GL1 to GLm. The gate driver 130 may be formed as an IC or directly formed on the display panel 150 in a gate-in-panel structure, but the present disclosure is not limited thereto. However, for convenience of description, a gate-in-panel type gate driver will be described below as an example, as shown in FIG. 2 and FIG. 3.

The gate-in-panel type gate driver 130 may include shift registers 130*a* and 130*b* formed in a gate-in-panel type on one side and the other side of a non-active area NA of the display panel 150. The shift registers 130*a* and 130*b* may be formed in the form of a thin film in the gate-in-panel type in the non-active area NA of the display panel 150. The gate-in-panel type gate driver 130 may output gate signals Gate[1] to Gate[m] for turning on or off transistors formed in the active area AA of the display panel 150.

The gate-in-panel type gate driver 130 may operate based on signals and voltages output from the timing controller 120, the power supply 180, and a level shifter 160. The level shifter 160 may generate gate control signals required for operation of the gate-in-panel type gate driver 130, 130*a*, and 130*b* on the basis of signals and voltages output from the timing controller 120 and the power supply 180.

The data driver 140 may sample and latch a data signal DATA in response to the data timing control signal DDC supplied from the timing controller 120 and convert a digital data signal into an analog data voltage on the basis of a gamma reference voltage and output the analog data voltage. The data driver 140 may supply data voltages to subpixels included in the display panel 150 through data lines DL1 to DLn. The data driver 140 may be formed as an IC and mounted on the display panel 150 or on a printed circuit board, but the present disclosure is not limited thereto.

The power supply 180 may generate a high-level voltage and a low-level voltage based on an external input voltage supplied from the outside, and output the same through a high-level voltage line EVDD and a low-level voltage line EVSS. The power supply 180 may generate and output not only the high-level voltage and the low-level voltage, but also voltages required for operation of the gate driver 130 or voltages required for operation of the data driver 140.

The display panel 150 may be manufactured based on a rigid or flexible substrate such as glass, silicon, or polyimide. The display panel 150 may include a plurality of subpixels SP for displaying an image. The subpixels SP can directly emit light to an upper substrate, a lower substrate, or the upper and lower substrates of the display panel 150. The subpixels SP may emit one of colors, such as red, green, blue, and white. The display panel 150 may display an image based on pixels composed of red subpixels, green subpixels, and blue subpixels, or pixels composed of red subpixels, green subpixels, blue subpixels, and white subpixels.

In the above description, the timing controller 120, the gate driver 130, the data driver 140, etc., are described as separate components. However, depending on the implementation of the light-emitting display device, one or more of the timing controller 120, the gate driver 130, and the data driver 140 may be integrated into one IC.

Figure 4:
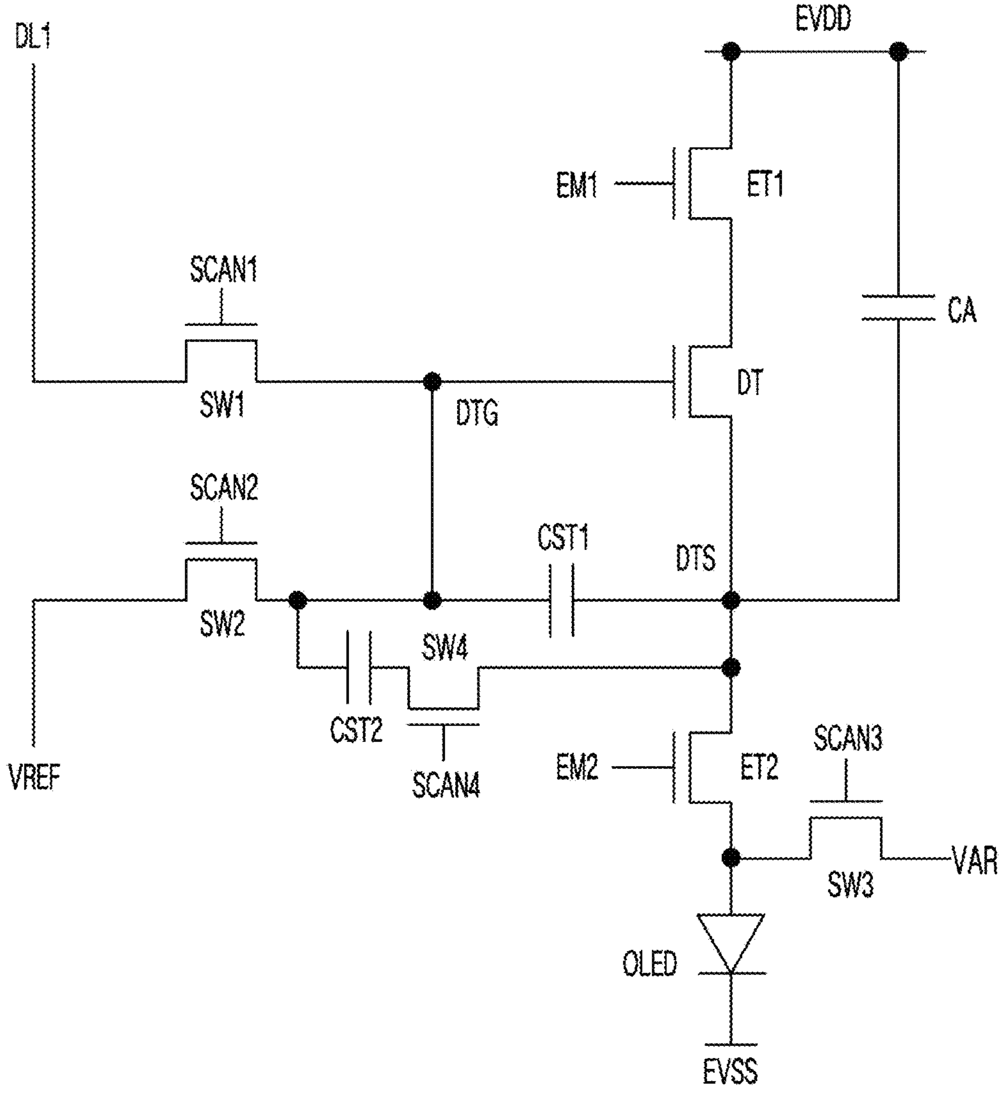
FIG. 4 is a circuit diagram of a subpixel according to an embodiment of the present disclosure, and FIG. 5 show driving waveforms for driving the subpixel illustrated in FIG. 4.
Figure 5:
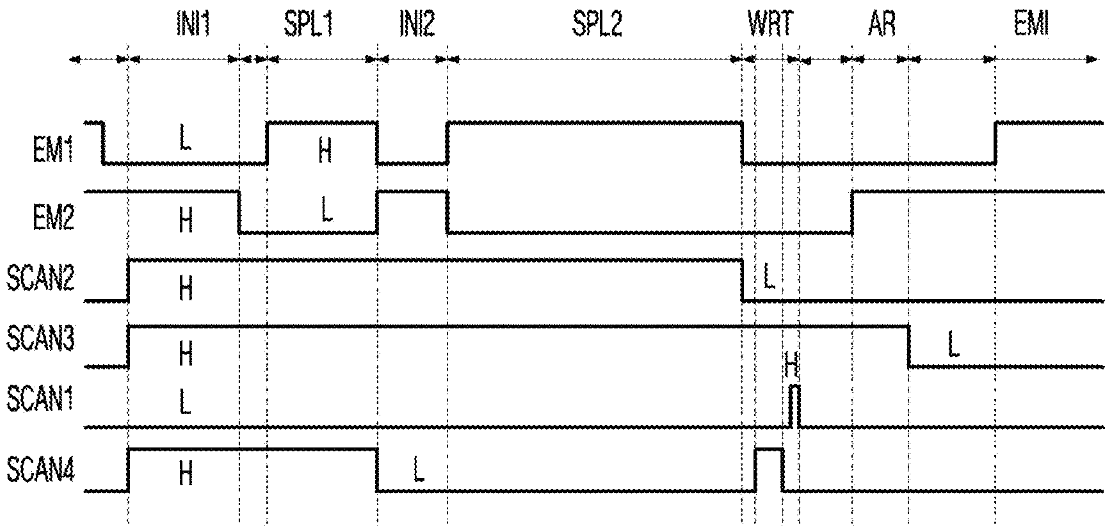

FIG. 4 is a circuit configuration diagram of a subpixel according to an embodiment of the present disclosure, and FIG. 5 shows driving waveforms for driving the subpixel illustrated in FIG. 4.

As illustrated in FIG. 4, a subpixel according to an embodiment may include a first switching transistor SW1, a second switching transistor SW2, a third switching transistor SW3, a fourth switching transistor SW4, a first control transistor ET1, a second control transistor ET2, a driving transistor DT, a first capacitor CST1, a second capacitor CST2, a third capacitor CA, and a light-emitting diode OLED.

The first switching transistor SW1 may have a gate electrode connected to a first scan line SCAN1, a first electrode connected to a first data line (DL1), and a second electrode connected to a gate node DTG of the driving transistor DT (or a gate electrode of the driving transistor). The first switching transistor SW1 may transmit a data voltage applied through the first data line DL1 to the gate node DTG of the driving transistor DT in response to a first scan signal applied through the first scan line SCAN1.

The second switching transistor SW2 may have a gate electrode connected to a second scan line SCAN2, a first electrode connected to a reference voltage line VREF, and a second electrode connected to the gate node DTG of the driving transistor DT (or the gate electrode of the driving transistor). The second switching transistor SW2 may transmit a reference voltage applied through the reference voltage line VREF to the gate node DTG of the driving transistor DT in response to a second scan signal applied through the second scan line SCAN2.

The third switching transistor SW3 may have a gate electrode connected to a third scan line SCAN3, a first electrode connected to an initialization voltage line VAR, and a second electrode connected to a second electrode of the second control transistor ET2 and an anode of the light-emitting diode OLED. The third switching transistor SW3 may transmit an initialization voltage applied through the initialization voltage line VAR to the anode of the light-emitting diode OLED in response to a third scan signal applied through the third scan line SCAN3.

The fourth switching transistor SW4 may have a gate electrode connected to a fourth scan line SCAN4, a first electrode connected to a second electrode of the second capacitor CST2, and a second electrode connected to a source node DTS of the driving transistor DT (or a second electrode of the driving transistor). The fourth switching transistor SW4 may cause the reference voltage to be sampled in the second capacitor CST2 in response to a fourth scan signal applied through the fourth scan line SCAN4, and may cause a sampled value stored in the second capacitor CST2 and a sampled value stored in the first capacitor CST1 to be summed. Therefore, the fourth switching transistor SW4 may be defined as a compensation transistor that performs a compensation operation for assisting in summing sampled values.

The first control transistor ET1 may have a gate electrode connected to a first control line EM1, a first electrode connected to the high-level voltage line EVDD, and a second electrode connected to a drain node of the driving transistor DT (or a first electrode of the driving transistor). The first control transistor ET1 may transmit a high-level voltage applied through the high-level voltage line EVDD to the drain node of the driving transistor DT (or the first electrode of the driving transistor) in response to a first control signal applied through the first control line EM1.

The second control transistor ET2 may have a gate electrode connected to a second control line EM2, a first electrode connected to the source node DTS of the driving transistor DT (or the second electrode of the driving transistor), and a second electrode connected to the anode of the light-emitting diode OLED. The second control transistor ET2 may transmit a driving current generated from the driving transistor DT to the anode of the light-emitting diode OLED in response to a second control signal applied through the second control line EM2.

The driving transistor DT has the gate electrode connected to the second electrode of the first switching transistor SW1, the second electrode of the second switching transistor SW2, the first electrode of the first capacitor CST1, and the first electrode of the second capacitor CST2, the first electrode connected to the second electrode of the first control transistor ET1, and the second electrode connected to the first electrode of the second control transistor ET2. The driving transistor DT operates based on a data voltage stored in the first capacitor CST1 and may generate a driving current.

The first capacitor CST1 has the first electrode connected to the second electrode of the first switching transistor SW1, the second electrode of the second switching transistor SW2, the gate node DTG of the driving transistor DT (or the gate electrode of the driving transistor), and the first electrode of the second capacitor CST2, and the second electrode connected to the source node DTS of the driving transistor DT (or the second electrode of the driving transistor). The first capacitor CST1 may perform a sampling operation based on the reference voltage transmitted through the second switching transistor SW2, store a sampled value, and also store a data voltage transmitted through the first switching transistor SW1. The first capacitor CST1 may be defined as a capacitor for storing a data voltage.

The second capacitor CST2 has the first electrode connected to the second electrode of the second switching transistor SW2, the gate node DTG of the driving transistor DT (or the gate electrode of the driving transistor), and the first electrode of the first capacitor CST1, and the second electrode connected to the first electrode of the fourth switching transistor SW4. The second capacitor CST2 may perform a sampling operation based on the reference voltage transmitted through the second switching transistor SW2 and store a sampled value. The second capacitor CST2 may be defined as a compensation capacitor for compensating for a sampling deviation along with the first capacitor CST1. The second capacitor CST2 defined as a compensation capacitor may have a smaller electrostatic capacitance than the first capacitor CST1.

The third capacitor CA has a first electrode connected to the high-level voltage line EVDD and a second electrode connected to the source node DTS of the driving transistor DT (or a second electrode of the driving transistor). The third capacitor CA may prevent (stabilize) the phenomenon in which the source node DTS of the driving transistor DT becomes unstable during the light-emitting operation of the subpixel. The third capacitor CA may be defined as an operation stabilization capacitor.

The light-emitting diode OLED has the anode electrode connected to the second electrode of the second control transistor ET2 and the second electrode of the third switching transistor SW3, and a cathode connected to the low-level voltage line EVSS. The light-emitting diode OLED may emit light based on the driving current of the driving transistor DT transmitted through the second control transistor ET2.

As illustrated in FIG. 4 and FIG. 5, the subpixel according to the embodiment may operate through a first initialization period INI1, a first sampling period SPL1, a second initialization period INI2, a second sampling period SPL2, a data write period WRT, a reset period AR, and an emission period EMI in order.

The states of voltages (signals) applied through signal lines during the first initialization period INI1 are as follows. The first control signal EM1 may be applied as a low voltage L, the second control signal EM2 may be applied as a high voltage H, the first scan signal SCAN1 may be applied as a low voltage L, and the second scan signal SCAN2, the third scan signal SCAN3, and the fourth scan signal SCAN4 may be applied as a high voltage H.

The states of the voltages (signals) applied through the signal lines during the first sampling period SPL1 are as follows. The first control signal EM1 may be applied as a high voltage H, the second control signal EM2 may be applied as a low voltage L, the first scan signal SCAN1 may be applied as a low voltage L, and the second scan signal SCAN2, the third scan signal SCAN3, and the fourth scan signal SCAN4 may be applied as a high voltage H.

The states of the voltages (signals) applied through the signal lines during the second initialization period INI2 are as follows. The first control signal EM1 may be applied as a low voltage L, the second control signal EM2 may be applied as a high voltage H, the first scan signal SCAN1 may be applied as a low voltage L, the second scan signal SCAN2 and the third scan signal SCAN3 may be applied as a high voltage H, and the fourth scan signal SCAN4 may be applied as a low voltage L.

The states of the voltages (signals) applied through the signal lines during the second sampling period SPL2 are as follows. The first control signal EM1 may be applied as a high voltage H, the second control signal EM2 may be applied as a low voltage L, the first scan signal SCAN1 may be applied as a low voltage L, the second scan signal SCAN2 and the third scan signal SCAN3 may be applied as a high voltage H, and the fourth scan signal SCAN4 may be applied as a low voltage L. During the second sampling period SPL2, the first control signal EM1 may maintain the high voltage H longer than in the first sampling period SPL1. That is, the first control signal EM1 can maintain the high voltage H for a longer time in the second sampling period SPL2 than in the first sampling period SPL1. This may be related to a first sampled value and a second sampled value which will be described below.

The states of the voltages (signals) applied through the signal lines during the data write period WRT are as follows. The first control signal EM1 and the second control signal EM2 may be applied as a low voltage L, the first scan signal SCAN1, the third scan signal SCAN3, and the fourth scan signal SCAN4 may be applied as a high voltage H, and the second scan signal SCAN2 can be applied as a low voltage L. During the data write period WRT, the fourth scan signal SCAN4 may be applied as a high voltage H first and then changed to a low voltage L, and then the first scan signal SCAN1 may be applied as a high voltage H. The time for which the high voltage H of the fourth scan signal SCAN4 is maintained may be longer than the time for which the high voltage H of the first scan signal SCAN1 is maintained during the data write period WRT.

The states of the voltages (signals) applied through the signal lines during the reset period AR are as follows. The first control signal EM1 may be applied as a low voltage L, the second control signal EM2 may be applied as a high voltage H, the first scan signal SCAN1, the second scan signal SCAN2, and the fourth scan signal SCAN4 may be applied as a low voltage L, and the third scan signal SCAN3 may be applied as a high voltage H.

The states of the voltages (signals) applied through the signal lines during the emission period EMI are as follows. The first control signal EM1 and the second control signal EM2 may be applied as a high voltage H, and the first scan signal SCAN1 to the fourth scan signal SCAN4 may be applied as a low voltage L.

According to an embodiment, the first scan line SCAN1, the second scan line SCAN2, the third scan line SCAN3, the fourth scan line SCAN4, the first control line EM1, and the second control line EM2 may be included in a signal line through which signals for controlling subpixels disposed in one horizontal line (for example, subpixels disposed in GL1 in FIG. 1) in the display panel are applied. That is, the first scan line SCAN1, the second scan line SCAN2, the third scan line SCAN3, the fourth scan line SCAN4, the first control line EM1, and the second control line EM2 may be included in the first gate line GL1 in FIG. 1.

According to an embodiment, the high-level voltage line EVDD, the low-level voltage line EVSS, the reference voltage line VREF, and the initialization voltage line VAR may be included in voltage lines for applying voltages to all subpixels disposed in the display panel. At least one of the high-level voltage line EVDD, the low-level voltage line EVSS, the reference voltage line VREF, or the initialization voltage line VAR may include a branch line and may be disposed in a mesh form.

According to an embodiment, the first switching transistor SW1, the second switching transistor SW2, the third switching transistor SW3, the fourth switching transistor SW4, the first control transistor ET1, the second control transistor ET2, and the driving transistor DT may be n-type oxide transistors.

However, the configuration of the subpixel according to the embodiment is merely an example and is not limited thereto and may be modified into other forms. For example, transistors, voltage lines, signal lines, etc., may be further added or deleted, or circuit connection relationships be modified accordingly.

FIG. 6 to FIG. 13 are diagrams showing operation states of the subpixel according to the driving waveforms of FIG. 5.

Figure 6:
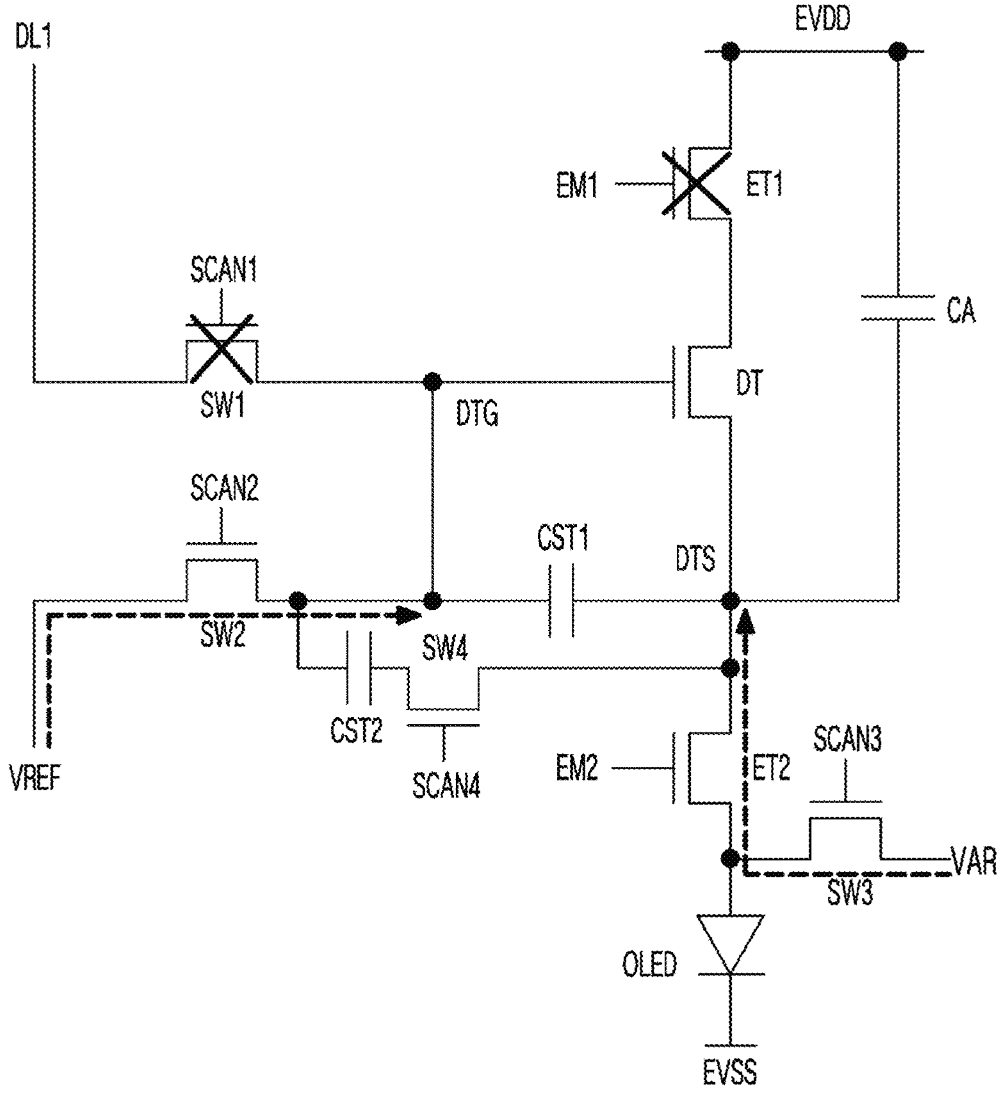
FIG. 6 to FIG. 13 are diagrams showing operation states of the subpixel according to the driving waveforms of FIG. 5.

As illustrated in FIG. 5 and FIG. 6, during the first initialization period INI1, the second switching transistor SW2, the third switching transistor SW3, and the second control transistor ET2 may be turned on. On the other hand, the first switching transistor SW1, the first control transistor ET1, and the driving transistor DT may be turned off.

As the second switching transistor SW2, the third switching transistor SW3, and the second control transistor ET2 are turned on during the first initialization period INI1, the gate node DTG and the source node DTS of the driving transistor DT can be initialized based on the reference voltage and the initialization voltage.

Figure 7:
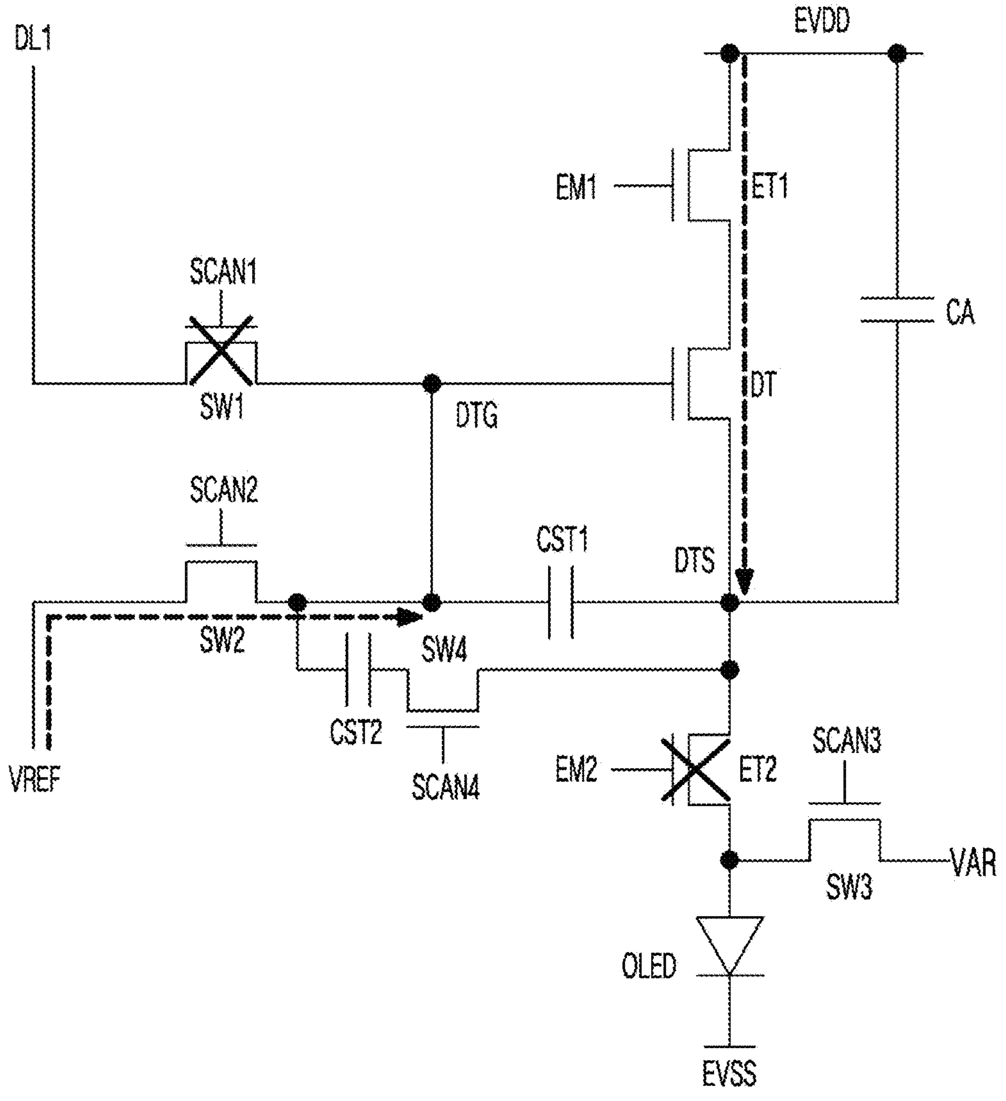

As illustrated in FIG. 5 and FIG. 7, during the first sampling period SPL1, the second switching transistor SW2, the third switching transistor SW3, the first control transistor ET1, and the driving transistor DT may be turned on. On the other hand, the first switching transistor SW1 and the second control transistor ET2 may be turned off.

As the second switching transistor SW2, the first control transistor ET1, and the driving transistor DT are turned on during the first sampling period SPL1, the second capacitor CST2 can store a first sampled value for the driving transistor DT on the basis of the reference voltage and the high-level voltage. During the first sampling period SPL1, sampling for the driving transistor DT may be performed for a first time shorter than the second sampling period SPL2. When the driving transistor DT is sampled for the relatively short first time, the mobility component of the driving transistor DT can be acquired due to the characteristics of current. Therefore, the first sampled value can include the mobility of the driving transistor DT.

Figure 8:
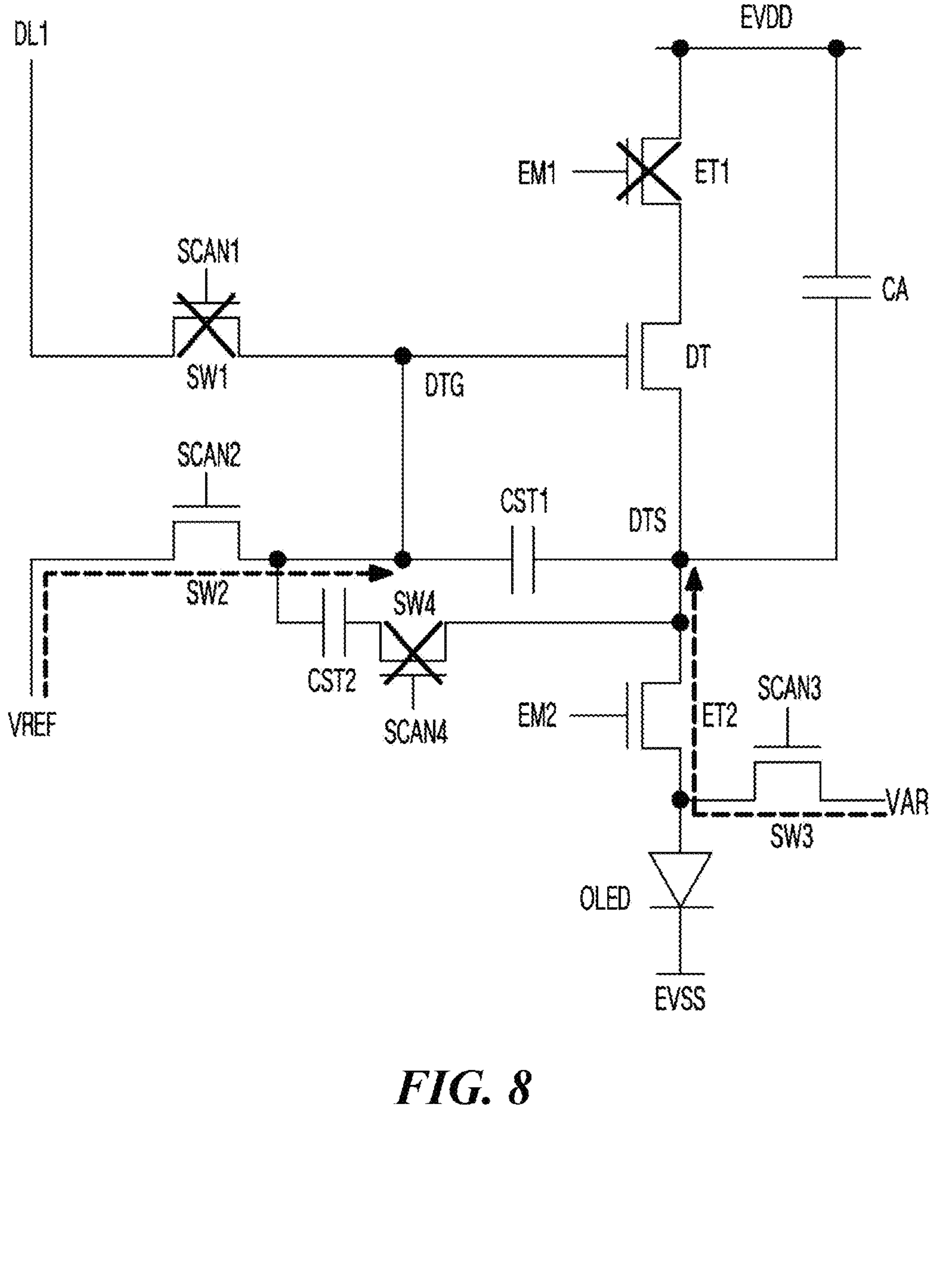

As illustrated in FIG. 5 and FIG. 8, during the second initialization period INI2, the second switching transistor SW2, the third switching transistor SW3, and the second control transistor ET2 may be turned on. On the other hand, the first switching transistor SW1, the fourth switching transistor SW4, the first control transistor ET1, and the driving transistor DT may be turned off.

As the second switching transistor SW2, the third switching transistor SW3, and the second control transistor ET2 are turned on during the second initialization period INI2, the gate node DTG and the source node DTS of the driving transistor DT can be initialized on the basis of the reference voltage and the initialization voltage.

Figure 9:
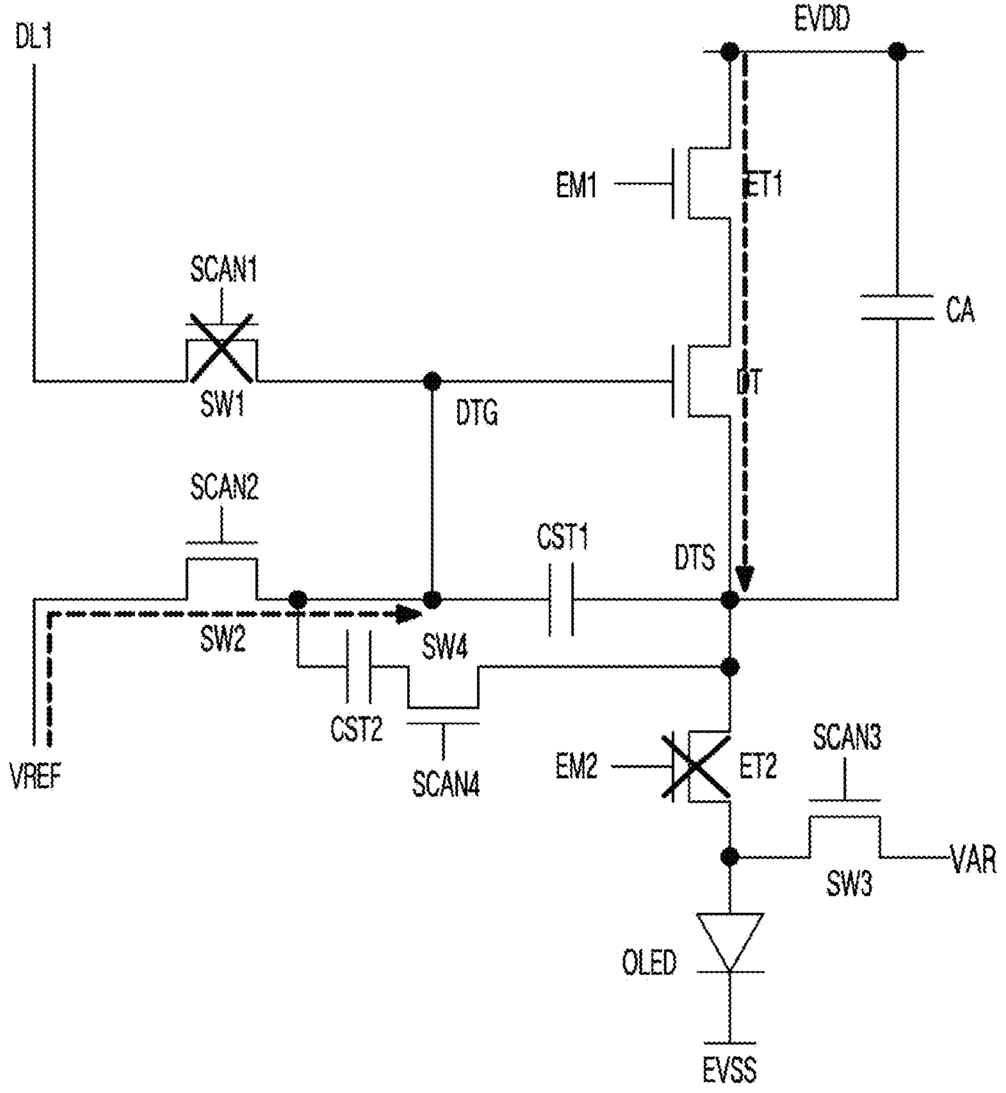

As illustrated in FIG. 5 and FIG. 9, during the second sampling period SPL2, the second switching transistor SW2, the third switching transistor SW3, the first control transistor ET1, and the driving transistor DT may be turned on. On the other hand, the first switching transistor SW1 and the second control transistor ET2 may be turned off.

As the second switching transistor SW2, the first control transistor ET1, and the driving transistor DT are turned on during the second sampling period SPL2, the first capacitor CST1 can store a second sampled value for the driving transistor DT on the basis of the reference voltage and the high-level voltage. During the second sampling period SPL2, sampling for the driving transistor DT can be performed for a second time longer than the first sampling period SPL1. When the driving transistor DT is sampled for the relatively long second time, the threshold voltage component of the driving transistor DT can be acquired due to the characteristics of current. Therefore, the second sampled value can include the threshold voltage of the driving transistor DT.

Figure 10:
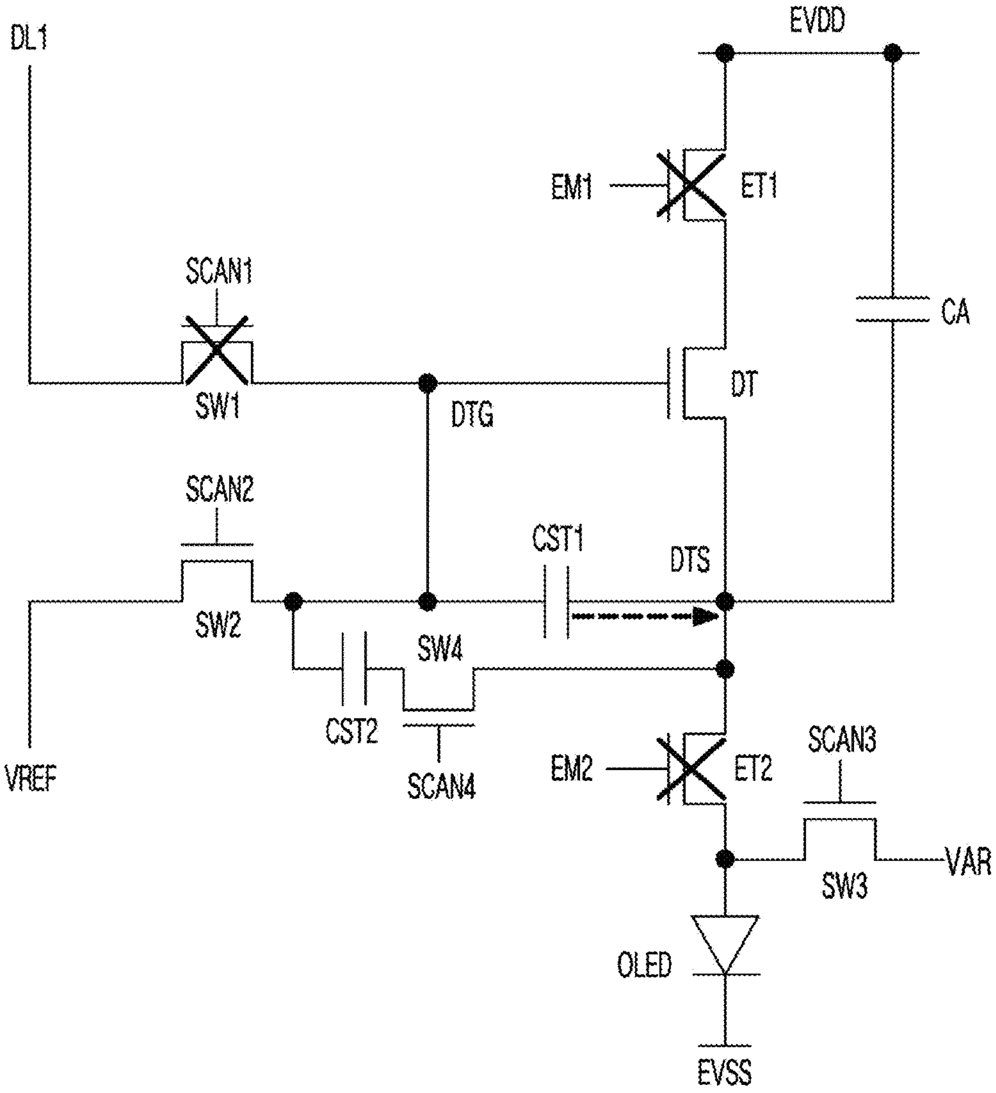
Figure 11:
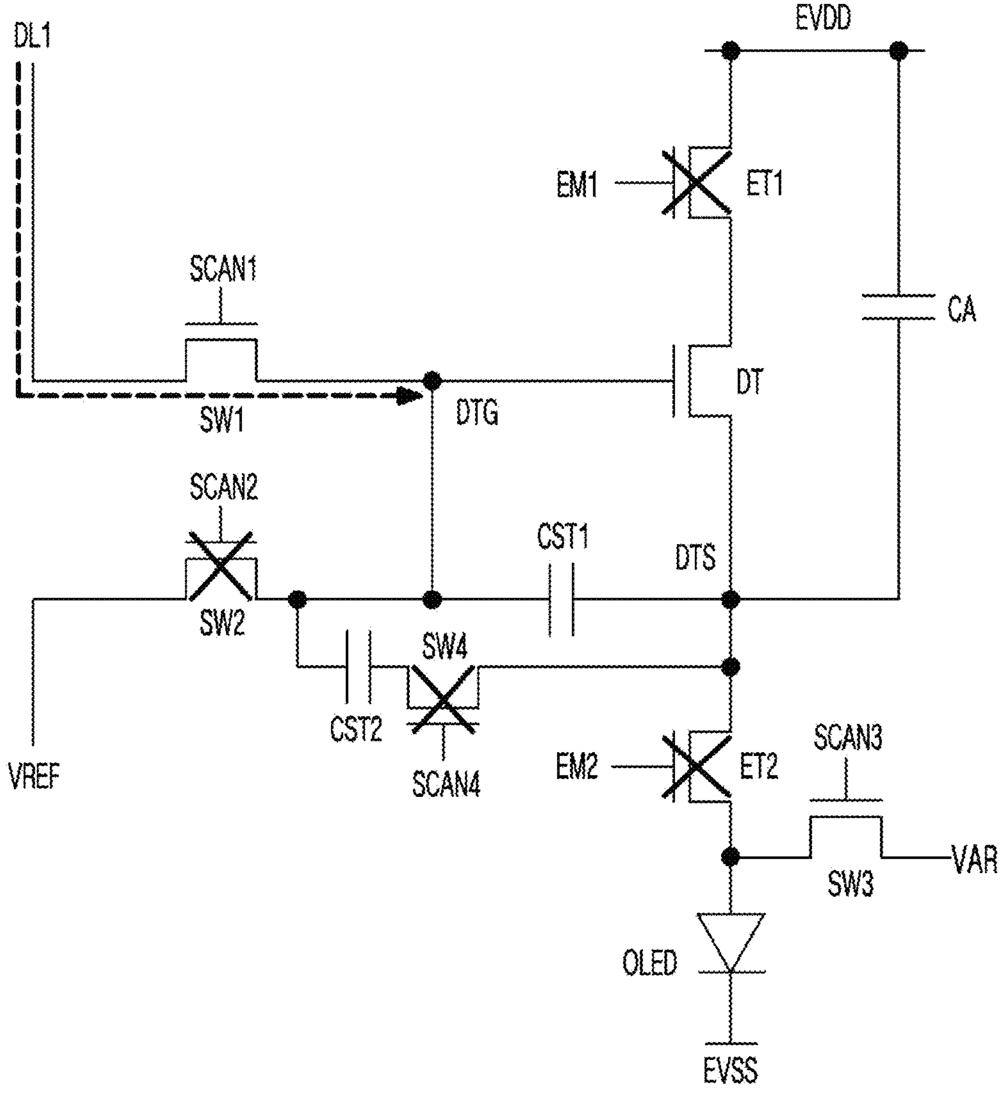

As illustrated in FIG. 5, FIG. 10, and FIG. 11, the data write period WRT may include a first data write period (FIG. 10) and a second data write period (FIG. 11). The first data write period (FIG. 10) may be defined as a compensation period, and thus will be described as a compensation period hereinafter.

As illustrated in FIG. 5 and FIG. 10, during the compensation period, the third switching transistor SW3 and the fourth switching transistor SW4 may be turned on. On the other hand, the first switching transistor SW1, the second switching transistor SW2, the first control transistor ET1, the second control transistor ET2, and the driving transistor DT may be turned off.

As the fourth switching transistor SW4 is turned on during the compensation period, the second sampled value stored in the first capacitor CST1 and the first sampled value stored in the second capacitor CST2 can be summed into one sampled value.

As shown in FIG. 5 and FIG. 11, during the data write period WRT, the first switching transistor SW1 and the third switching transistor SW3 may be turned on. On the other hand, the second switching transistor SW2, the first control transistor ET1, the second control transistor ET2, and the driving transistor DT may be turned off.

As the first switching transistor SW1 is turned on during the data write period WRT, the data voltage applied through the first data line DL1 can be stored in the first capacitor CST1.

Figure 12:
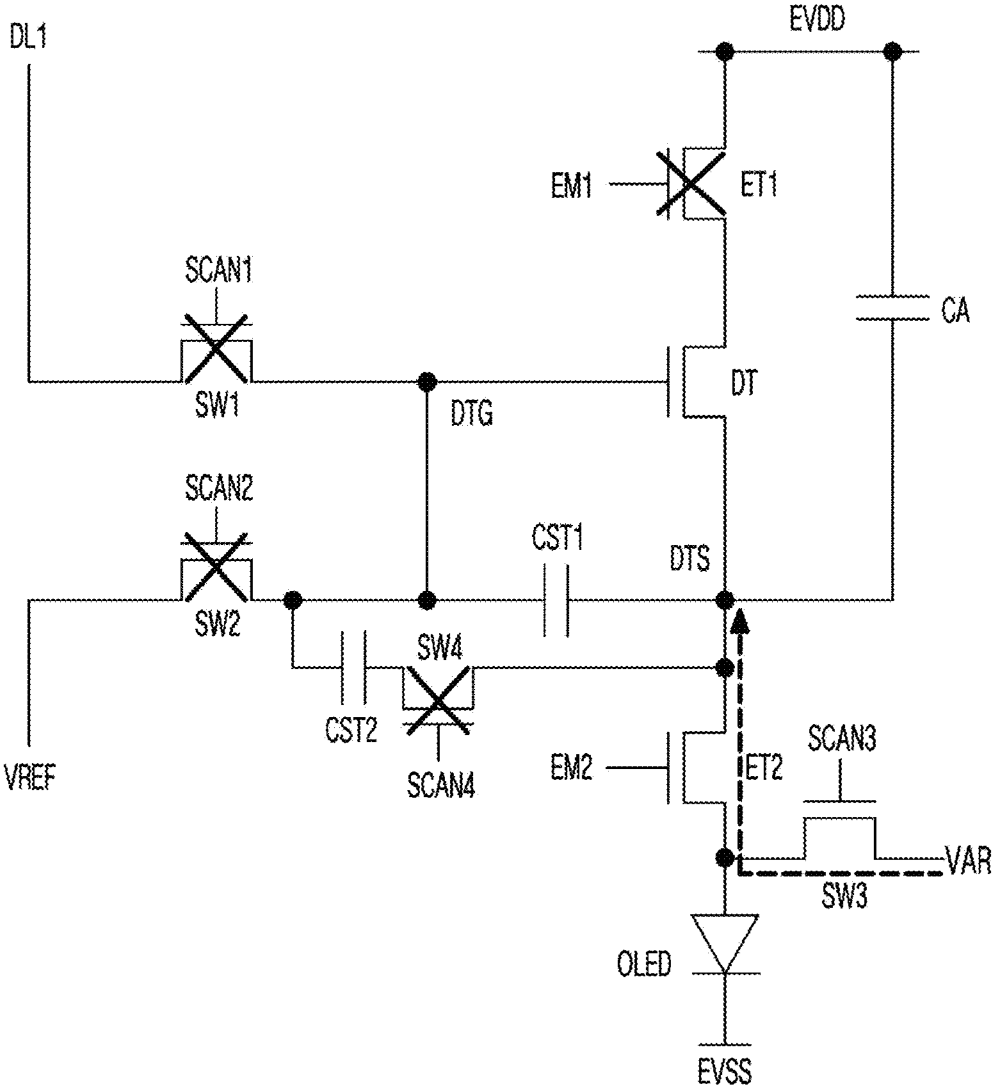

As illustrated in FIG. 5 and FIG. 12, during the reset period AR, the second control transistor ET2 and the third switching transistor SW3 may be turned on. On the other hand, the first switching transistor SW1, the second switching transistor SW2, the first control transistor ET1, and the driving transistor DT may be turned off.

As the second control transistor ET2 and the third switching transistor SW3 are turned on during the reset period AR, the source node DTS of the driving transistor DT and the anode of the light-emitting diode OLED can be initialized.

Figure 13:
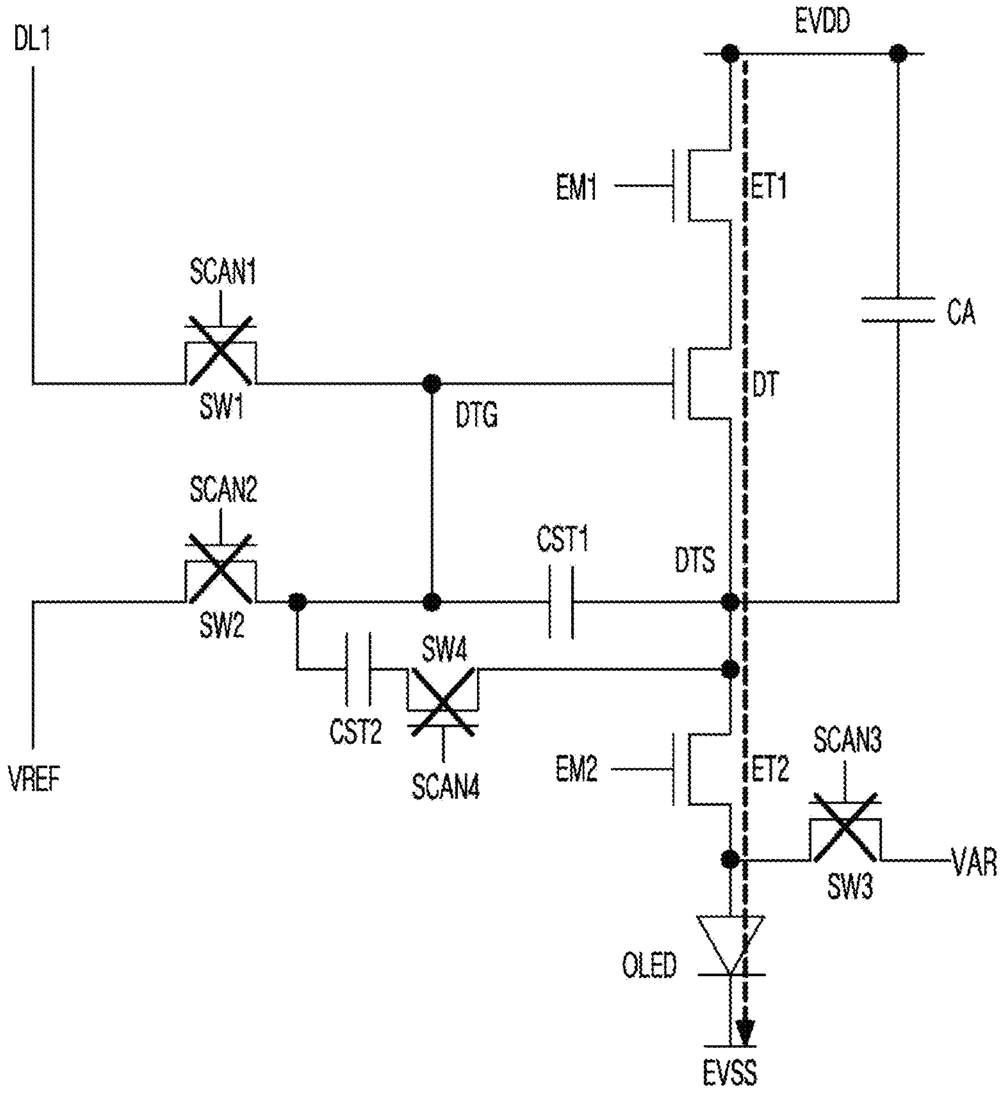

As illustrated in FIG. 5 and FIG. 13, during the emission period EMI, the first control transistor ET1, the second control transistor ET2, and the driving transistor DT may be turned on. On the other hand, the first to fourth switching transistors SW1 to SW4 may be turned off.

As the first control transistor ET1 and the second control transistor ET2 are turned on during the emission period EMI, the light-emitting diode OLED can emit light in response to the driving current generated from the driving transistor DT.

Figure 14:
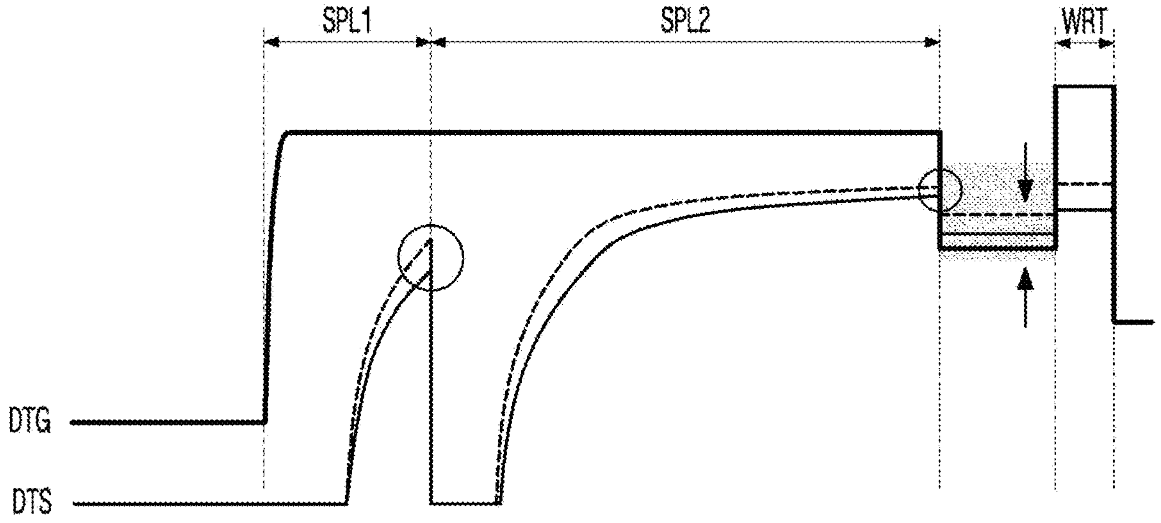
FIG. 14 and FIG. 15 are diagrams for comparing an embodiment and a comparative example.
Figure 15:
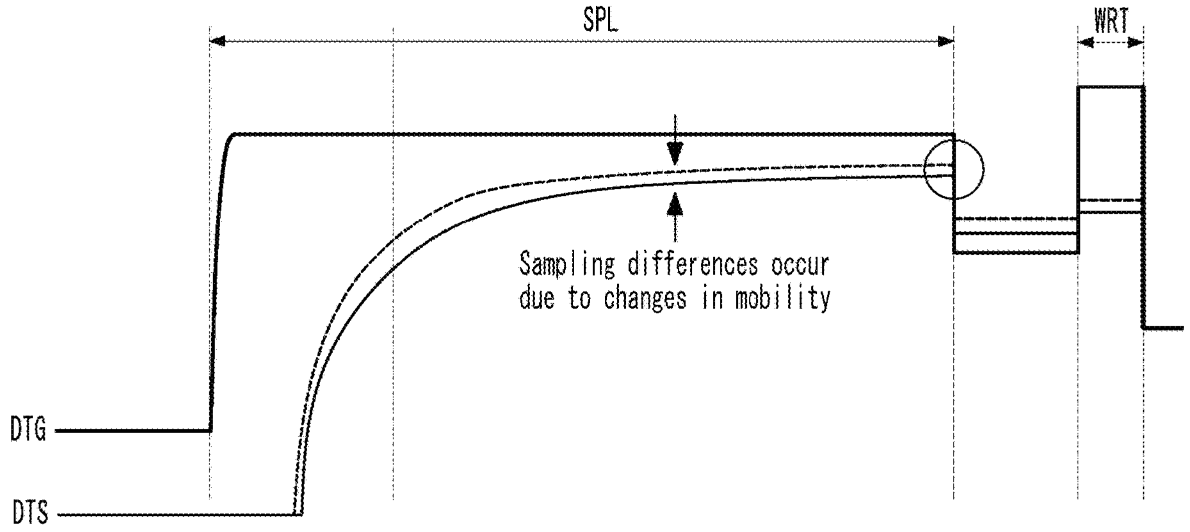

FIG. 14 and FIG. 15 are diagrams for comparing the embodiment and a comparative example. Here, the comparative example means a sample to which the circuit and driving method for performing two sampling operations as in the embodiment are not applied.

FIG. 14 and FIG. 15 show voltage variations at the gate node DTG and the source node DTS of the driving transistor included in the subpixel. As shown in FIG. 14 and FIG. 15, sampling is performed twice for the first sampling period SPL1 and the second sampling period SPL2 before the data write period WRT in the embodiment, whereas sampling is performed once for a sampling period SPL in the comparative example.

As in the embodiment, when sampling is performed twice before writing a data voltage, sampled values are summed into one sampled value, and then the data voltage is written, it is possible to solve the problem of sampling difference due to variation in the mobility of the driving transistor and temperature luminance sensitivity (TLS) defects caused thereby.

The TLS defects can cause a problem of luminance deviation at high temperatures (40° C.) and low temperatures (10° C.) when the driving temperature of the display panel changes. The TLS for the above conditions can be calculated by the following mathematical expression 1.

$$TLS = \frac{\left(\frac{(\text{Luminance@40} - \text{Luminance@10})}{\text{Luminance@25}}\right)}{40 - 10} \quad \text{Mathematical expression 1}$$

TLS defects may occur due to variation in the characteristics of elements (transistor and light-emitting diode) due to temperature variation. At this time, the transistor may be related to the threshold voltage Vth and mobility of at least one of the transistors included in the subpixel. In addition, the light-emitting diode may be related to current-voltage threshold voltage I-V Vth/capacitance-voltage threshold voltage C-V Vth/lateral current/efficiency.

Figure 16:
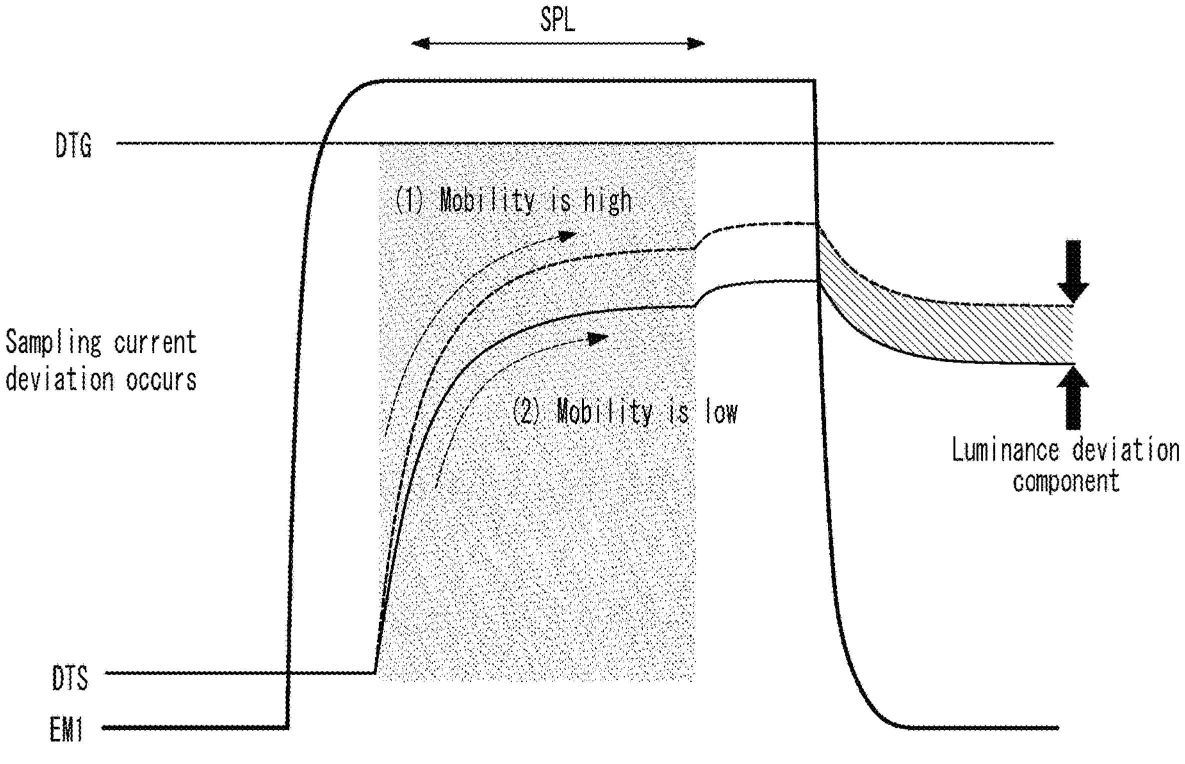
FIG. 16 to FIG. 19 are diagrams for briefly describing a mechanism of luminance deviation occurrence according to a change in mobility characteristics of a driving transistor.
Figure 17:
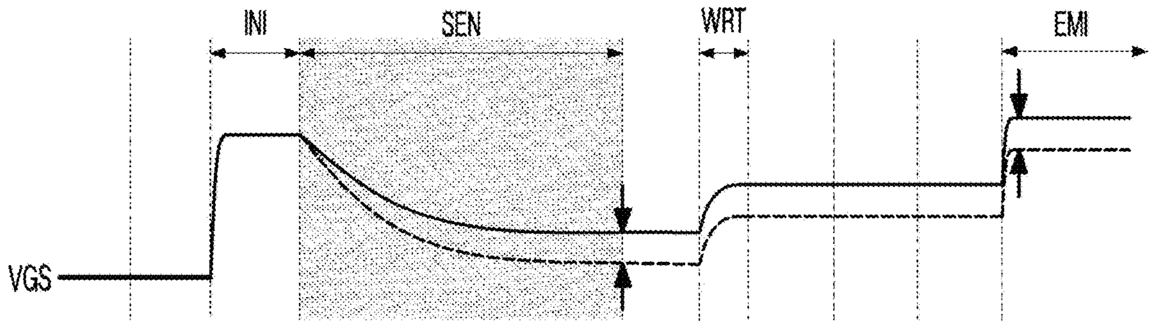

FIG. 16 to FIG. 19 are diagrams for briefly describing a mechanism of luminance deviation occurrence due to variation in the mobility characteristics of the driving transistor. FIG. 17 illustrates an example showing the gate-source voltage VGS deviation of the driving transistor when operating in the order of the initialization period INI, the sensing period SEN, the data write period WRT, and the emission period EMI according to a comparative example.

Figure 18:
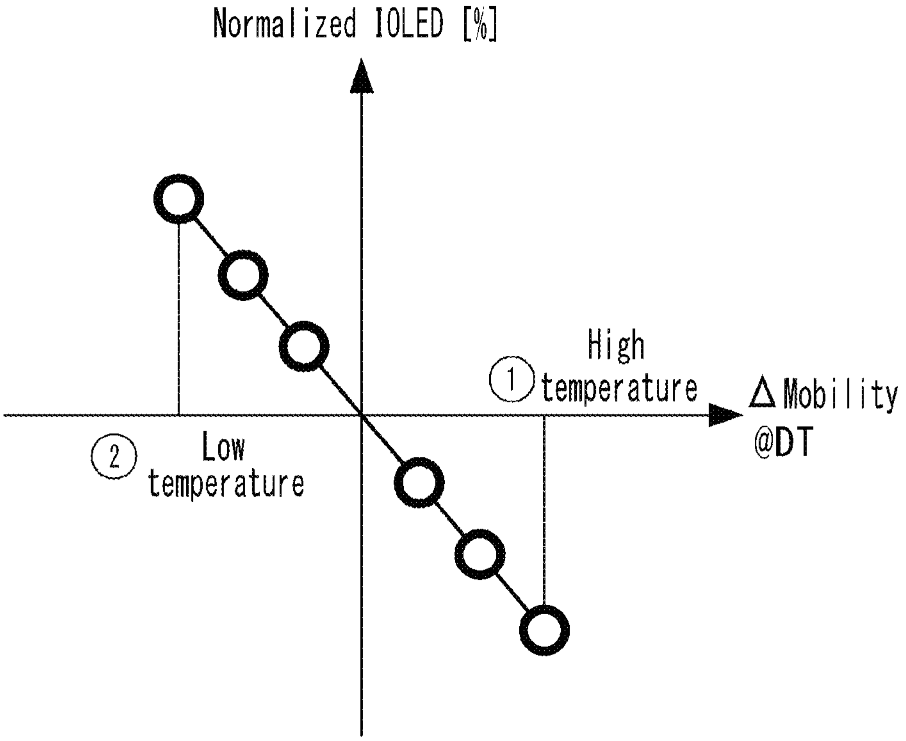
Figure 19:
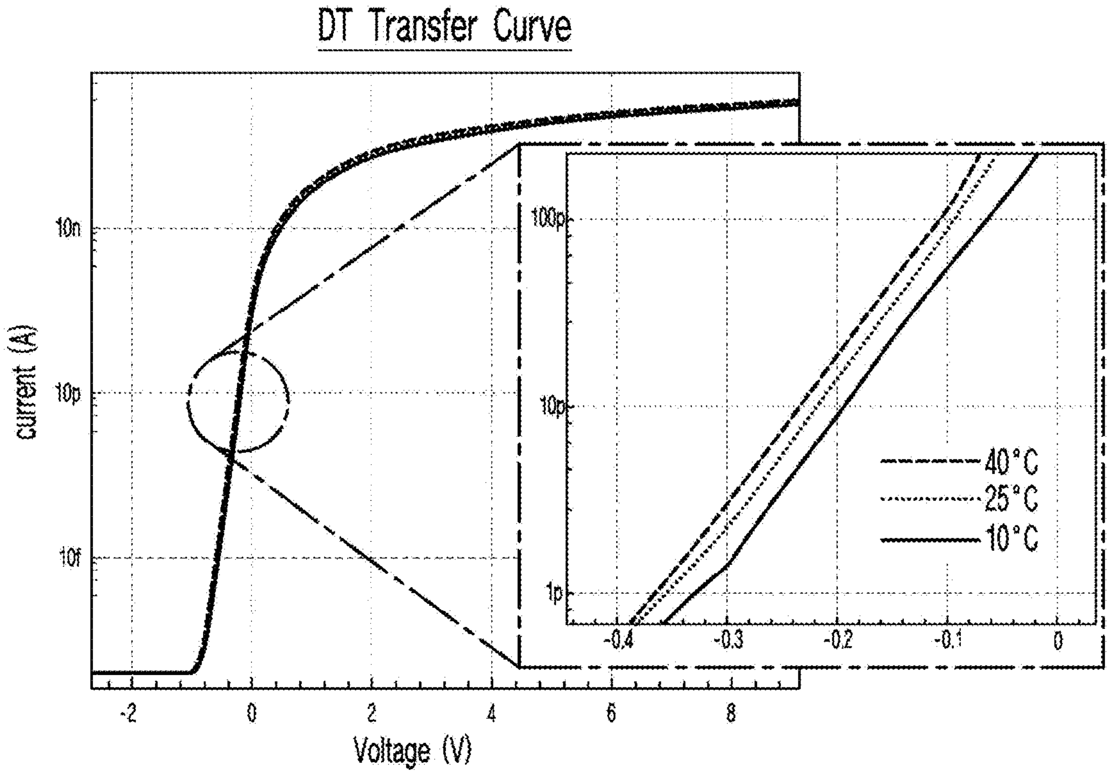

As represented by "(1) Mobility is high" and "(2) Mobility is low" in FIG. 16, the mobility of the driving transistor may decrease or increase depending on the temperature change of the display panel. As shown in FIG. 16 and FIG. 17, when the voltage rise at the source node DTS of the driving transistor increases as the temperature increases during a sampling period SPL, a deviation in the gate-source voltage VGS of the driving transistor may be caused by a sampling current deviation. In addition, the deviation in the gate-source voltage VGS of the driving transistor may lead to a luminance deviation component of the display panel. As shown in FIG. 18 and FIG. 19, problems related to the driving transistor may cause a luminance increase phenomenon (TLS<0) at low temperatures compared to high temperatures.

Figure 20:
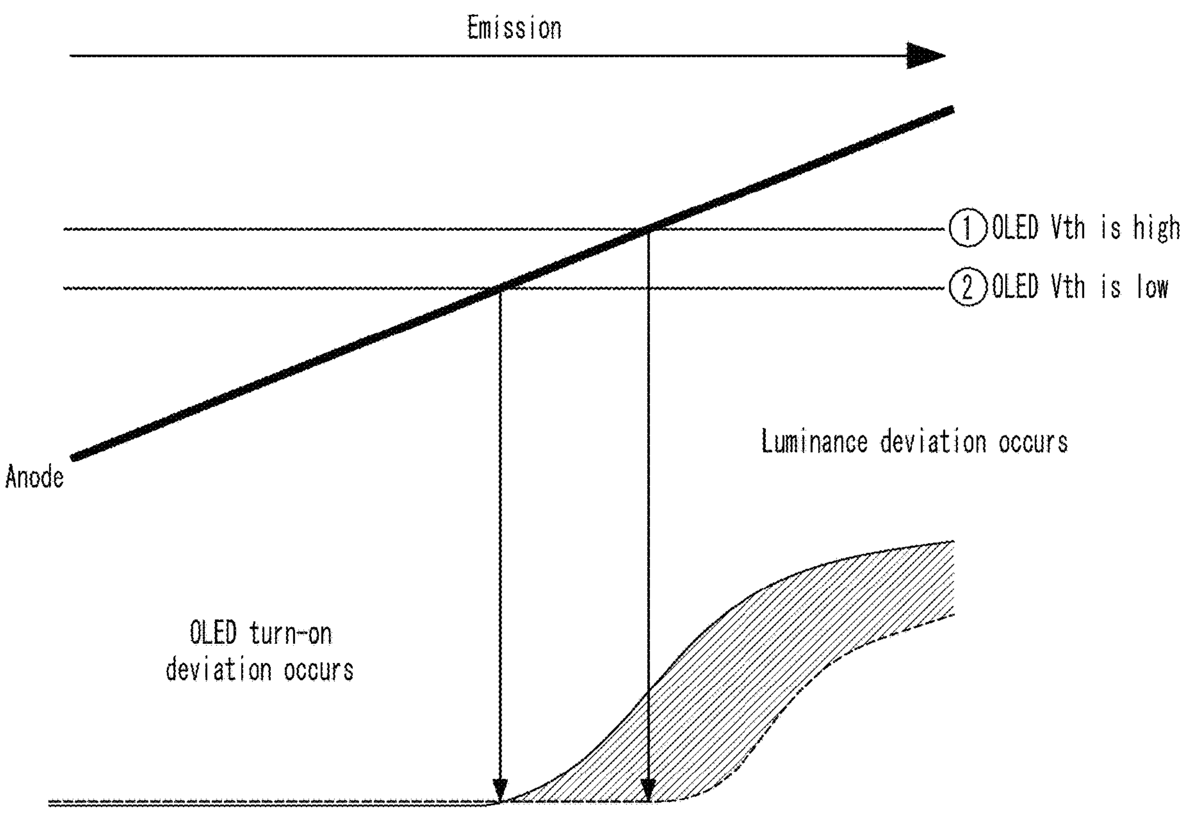
FIG. 20 and FIG. 21 are diagrams for briefly describing a mechanism of luminance deviation occurrence according to a change in current-voltage threshold voltage characteristics of a light-emitting diode.
Figure 21:
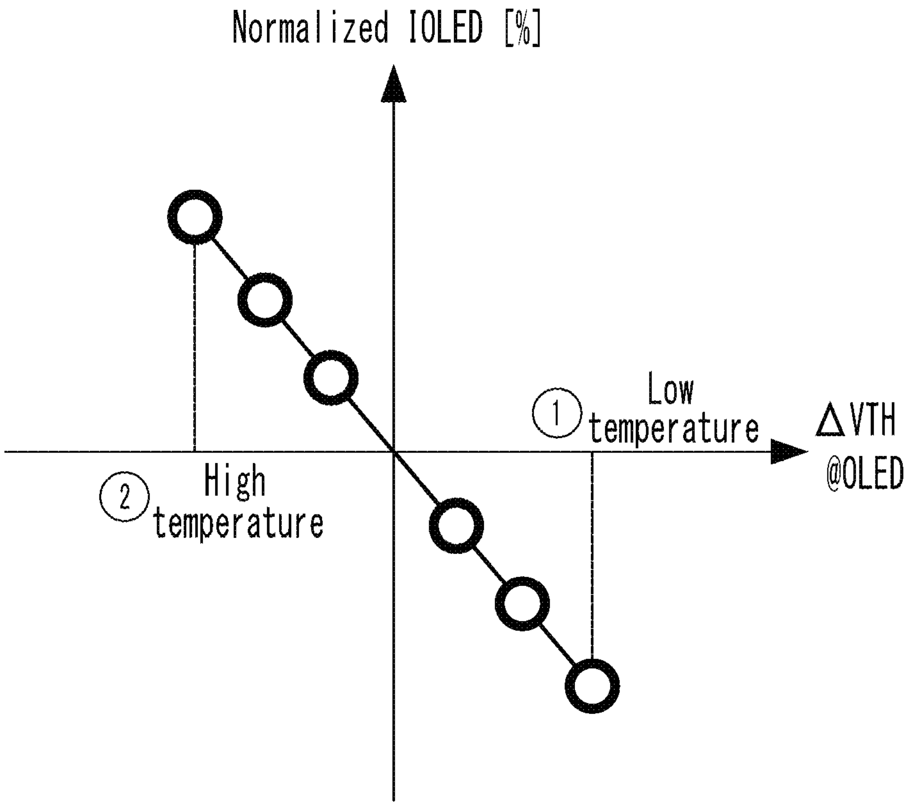

FIG. 20 and FIG. 21 are diagrams for briefly describing a mechanism of luminance deviation occurrence according to variation in the current-voltage threshold voltage characteristics of the light-emitting diode.

As represented by "(1) OLED Vth is high" and "(2) OLED Vth is low" in FIG. 20, the current-voltage threshold voltage of the light-emitting diode can decrease or increase according to temperature change of the display panel. As shown in FIG. 20, when the current-voltage threshold voltage of the light-emitting diode increases according to temperature increase, a turn-on deviation of the light-emitting diode may be induced. In addition, the turn-on deviation of the light-emitting diode may lead to a luminance deviation component of the display panel. As shown in FIG. 21, problems related to the light-emitting diode can cause a luminance increase phenomenon (TLS>0) at high temperatures compared to low temperatures when the same current flows.

Figure 22:
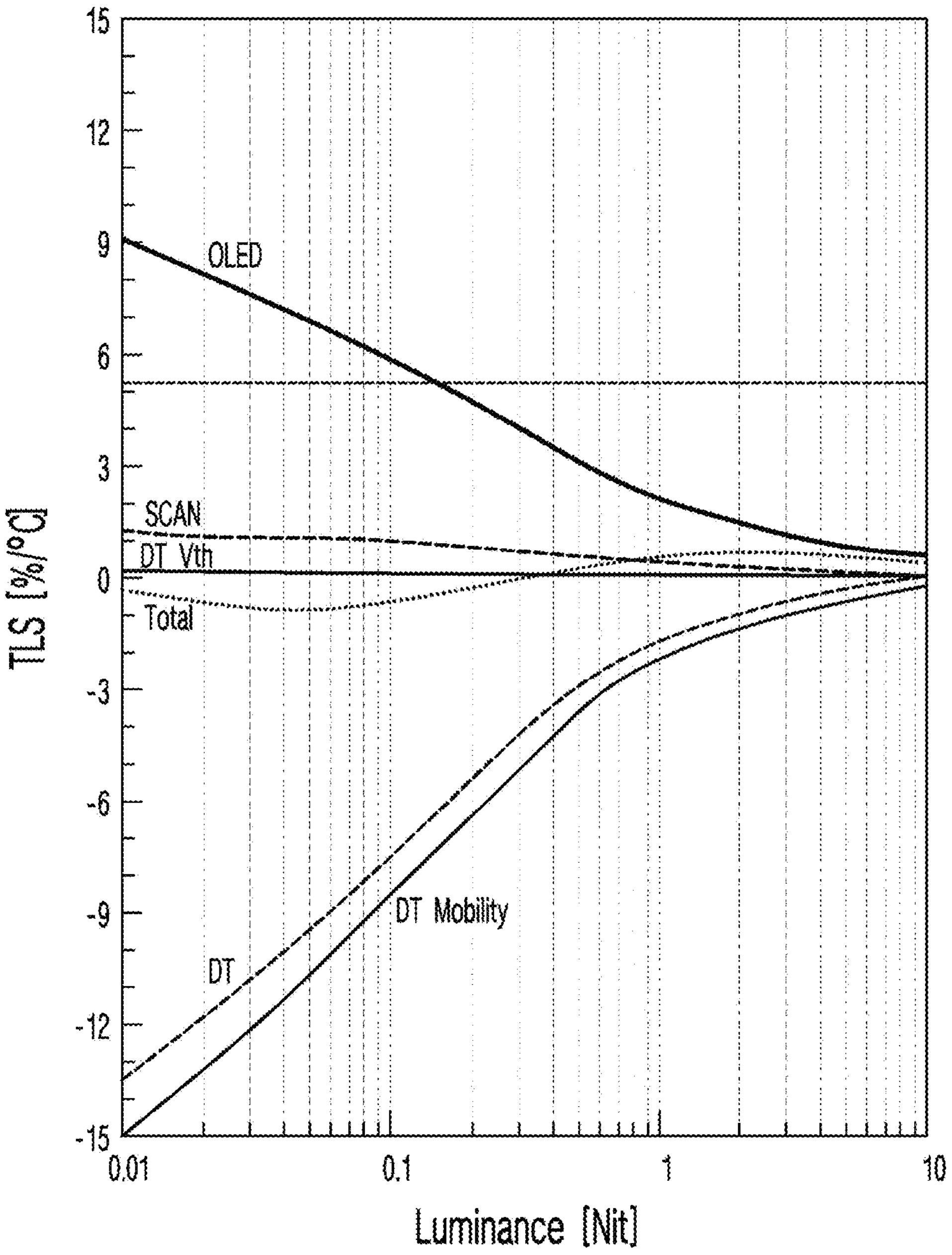
FIG. 22 and FIG. 23 are reference diagrams showing TLS-luminance graphs for an embodiment and a comparative example.
Figure 23:
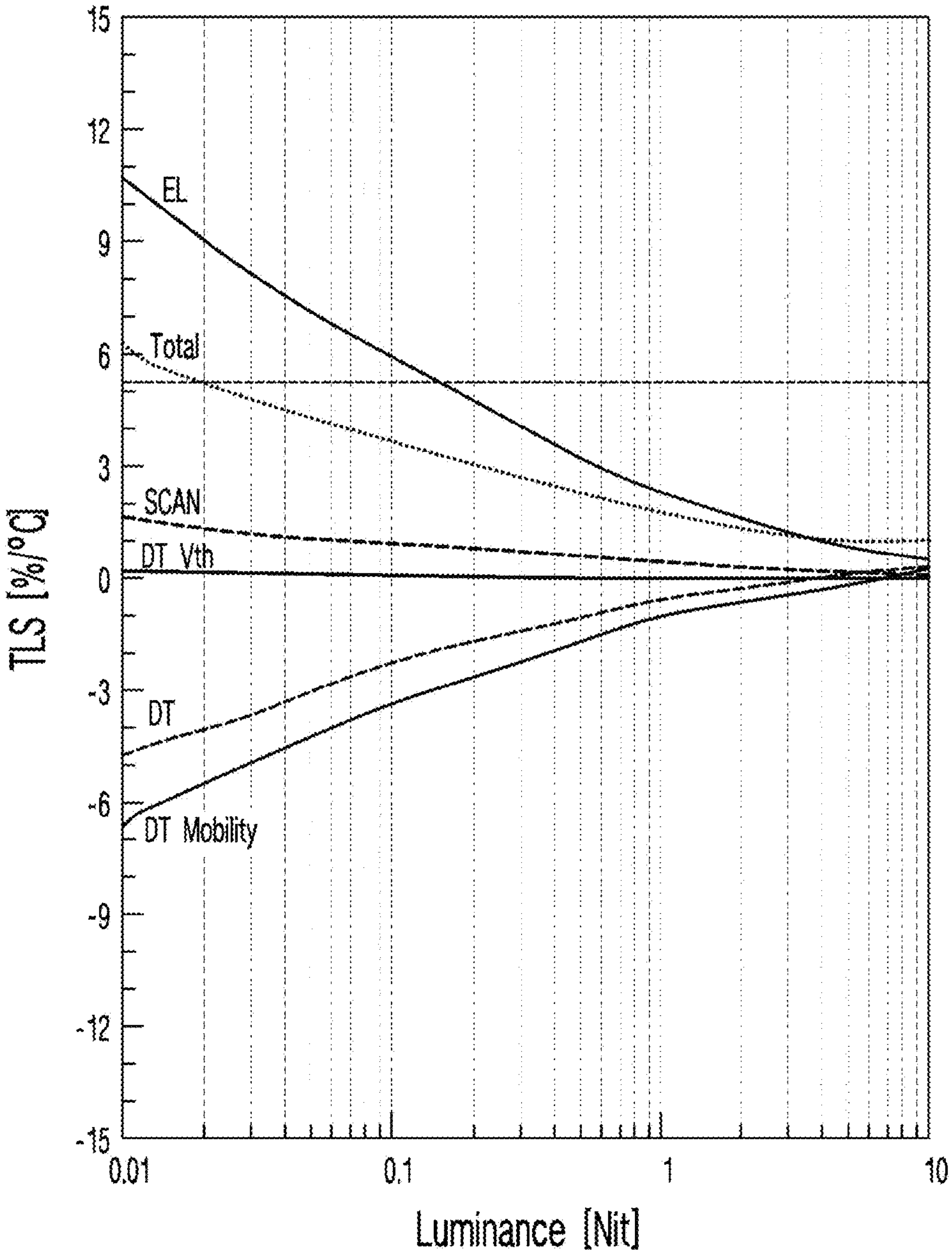

FIG. 22 and FIG. 23 are reference diagrams showing TLS-luminance graphs for the embodiment and the comparative example.

As shown in FIG. 22 and FIG. 23, the embodiment can sense and apply the mobility of the driving transistor DT compared to the comparative example. As a result, the embodiment can increase the influence of the driving transistor DT (increase the influence of the mobility of the DT) and can offset the influence of the light-emitting diode OLED on the basis of the increased influence of the driving transistor, and thus TLS defects can be addressed. Referring to FIG. 18 and FIG. 21 for additional description, TLS influences of the driving transistor DT and the light-emitting diode OLED are opposite to each other, and thus the influence of the light-emitting diode OLED can be offset if the influence of the mobility, which is the main factor of the driving transistor DT, is increased.

Figure 24:
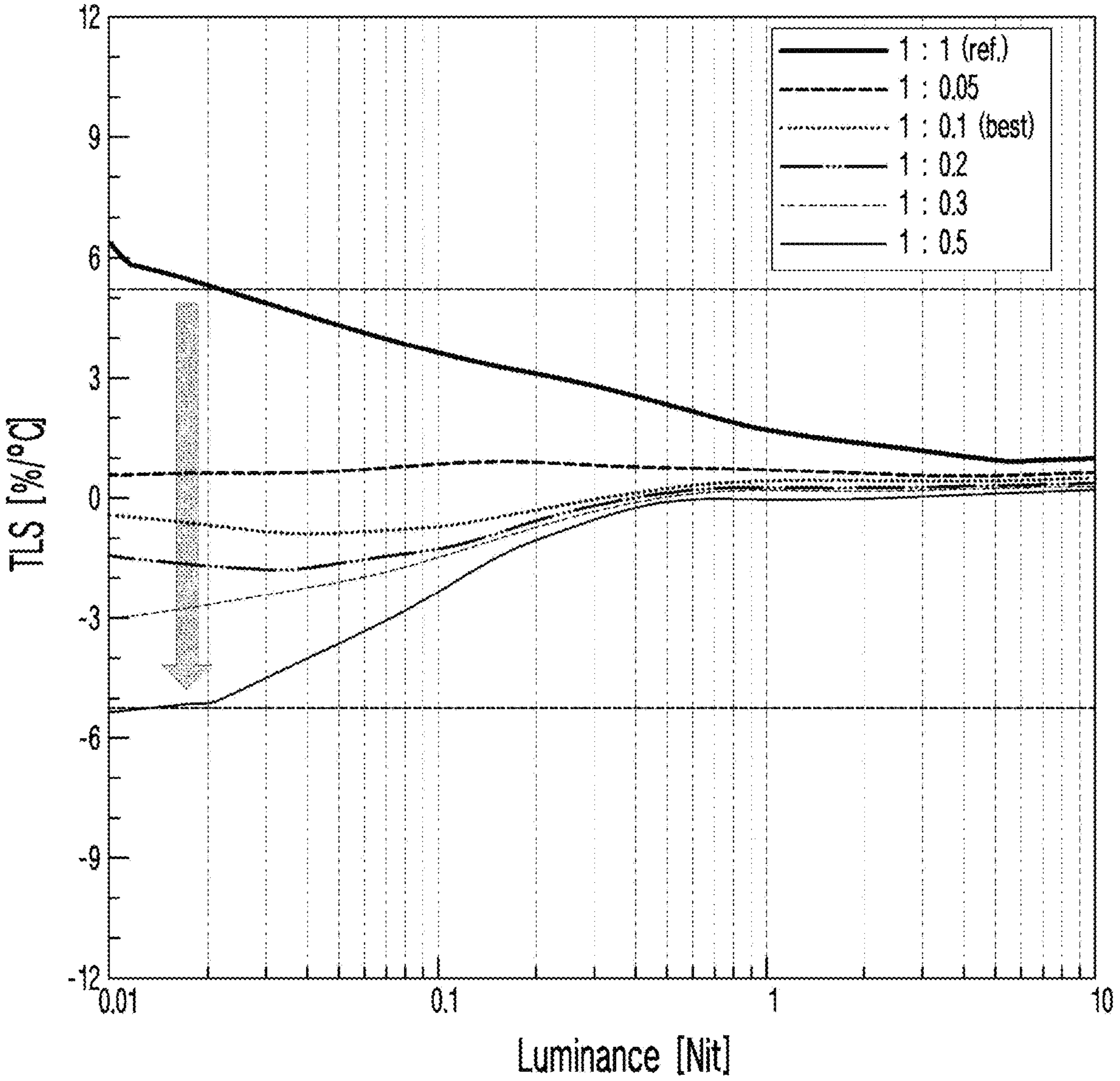
FIG. 24 is a diagram for describing a capacitance ratio of a first capacitor and a second capacitor considered when a TLS-luminance graph according to the embodiment is created.

FIG. 24 is a diagram for describing a capacitance ratio of a first capacitor and a second capacitor considered when a TLS-luminance graph according to the embodiment is created. In FIG. 24, "1:1 (ref)" is the capacitance ratio of the first capacitor and the second capacitor in an experimental example, and "1:0.05, 1:0.1, 1:0.2, 1:0.3, and 1:0.5" are capacitance ratios of the first capacitor and the second capacitor in the embodiment.

As shown in FIG. 24, the second capacitor CST2 may be selected in consideration of the capacitance ratio with respect to the first capacitor CST1. The capacitance ratio of the first capacitor CST1 and the second capacitor CST2 may have a range of 1:0.05 to 0.3, as shown in FIG. 24 and Table 1 below. It is shown that excellent effects can be exhibited when the capacitance ratio of the first capacitor CST1 and the second capacitor CST2 is 1:0.05 and 1:0.1.

TABLE 1

| Capacitance (ratio) of CST1 | Capacitance (ratio) of CST2 | Effect |
|---|---|---|
| 1 | 0.05 | Very good |
| 1 | 0.1 | Very good (Best) |
| 1 | 0.2 | Good |
| 1 | 0.3 | Good |
| 1 | 0.5 | Bad |

As can be ascertained from FIG. 24 and Table 1, when the capacitance proportion of the second capacitor CST2 increases, a deviation in the gate-source voltage due to the mobility of the driving transistor increases, and accordingly, a TLS reduction rate also increases. In addition, as a result of experiments performed by changing the capacitance ratio of the first capacitor CST1 and the second capacitor CST2, the best capacitance ratio was 1:0.1.

Figure 25:
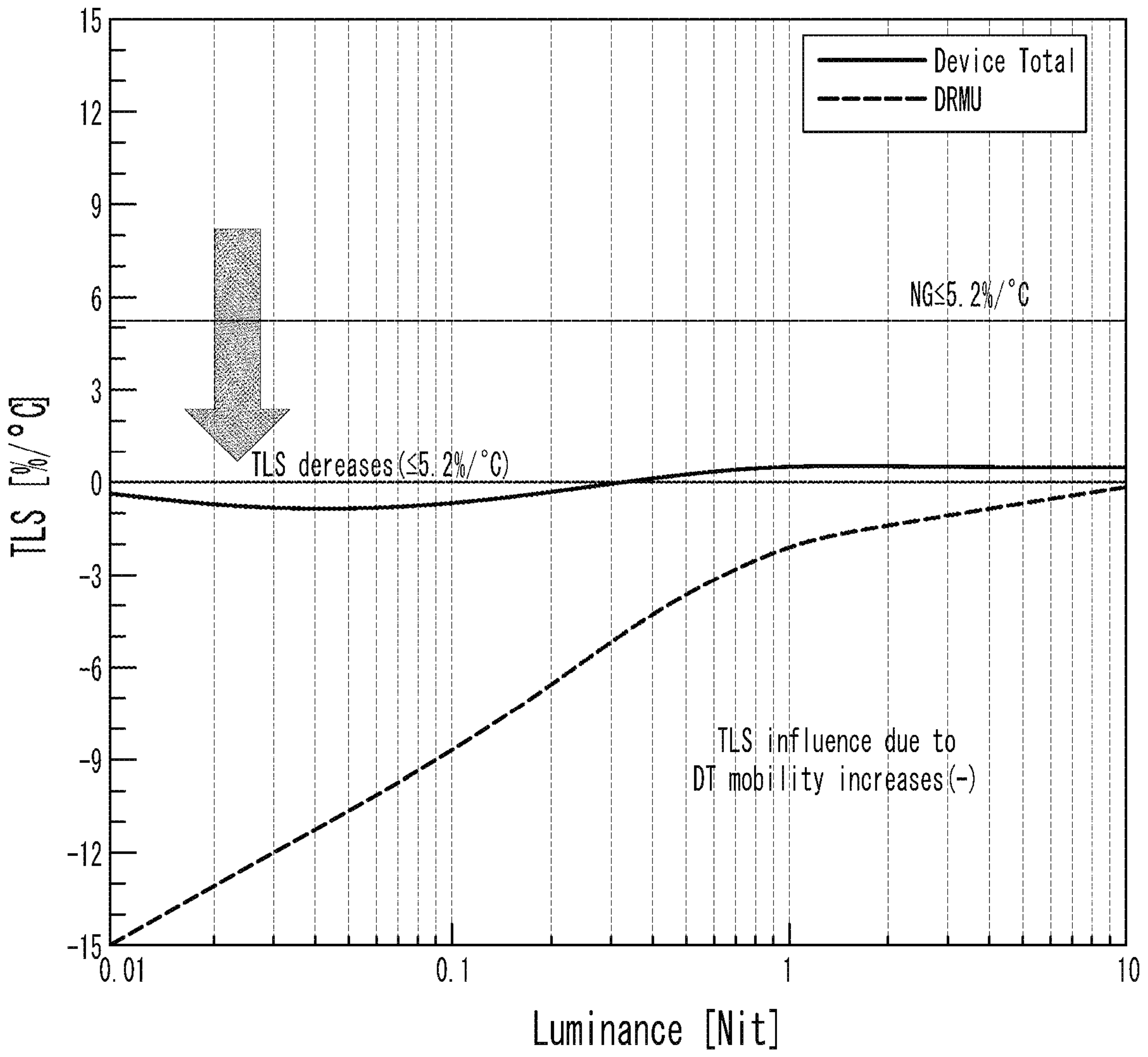
FIG. 25 and FIG. 26 are graphs showing TLS-luminance simulation results according to temperature increase in the embodiment and a comparative example.
Figure 26:
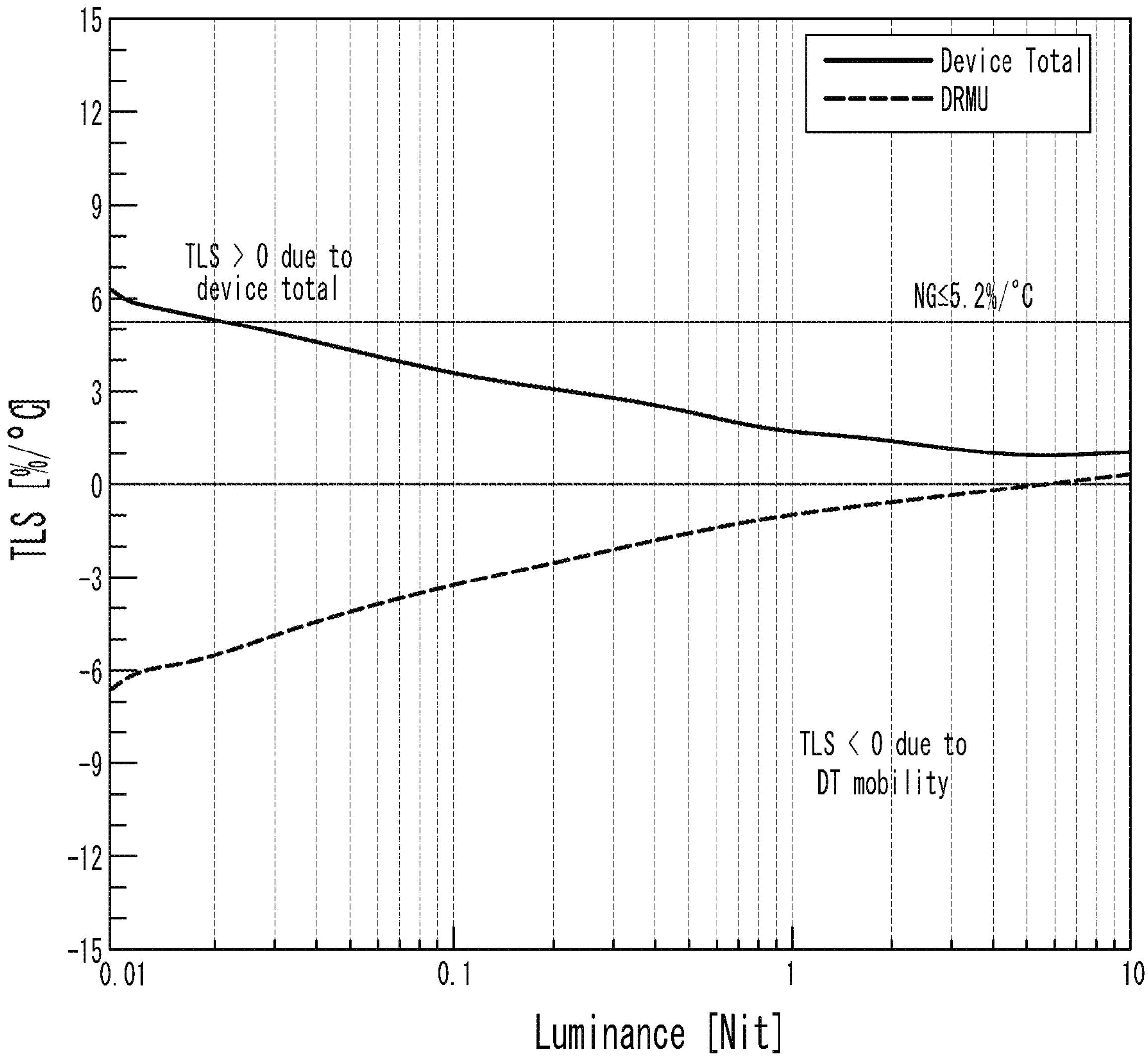

FIG. 25 and FIG. 26 are graphs showing results of TLS-luminance simulations according to temperature increase in the embodiment and a comparative example.

As shown in FIG. 25, the embodiment is implemented based on a circuit and a driving method that can reflect a gate-source voltage sampling deviation caused by the mobility of the driving transistor according to temperature increase. As a result, the embodiment can increase (−) (increase in the negative direction) the TLS influence caused by the mobility of the driving transistor and decrease TLS (≤5.2%/° C.). In other words, the embodiment can offset or reduce the TLS influence.

As shown in FIG. 26, the comparative example is not implemented based on a circuit and a driving method that can reflect a gate-source voltage sampling deviation caused by the mobility of the driving transistor according to temperature increase. As a result, the TLS influence (TLS<0) caused by the mobility of the driving transistor and TLS increase (TLS>0) appear in the comparative example. That is, it is ascertained that the comparative example is unable to offset or reduce the TLS influence. Meanwhile, in FIG. 25 and FIG. 26, the bad criterion for TLS-luminance simulations according to temperature increase is set to "NG≤5.2%/° C.," but this is merely an example.

Figure 27:
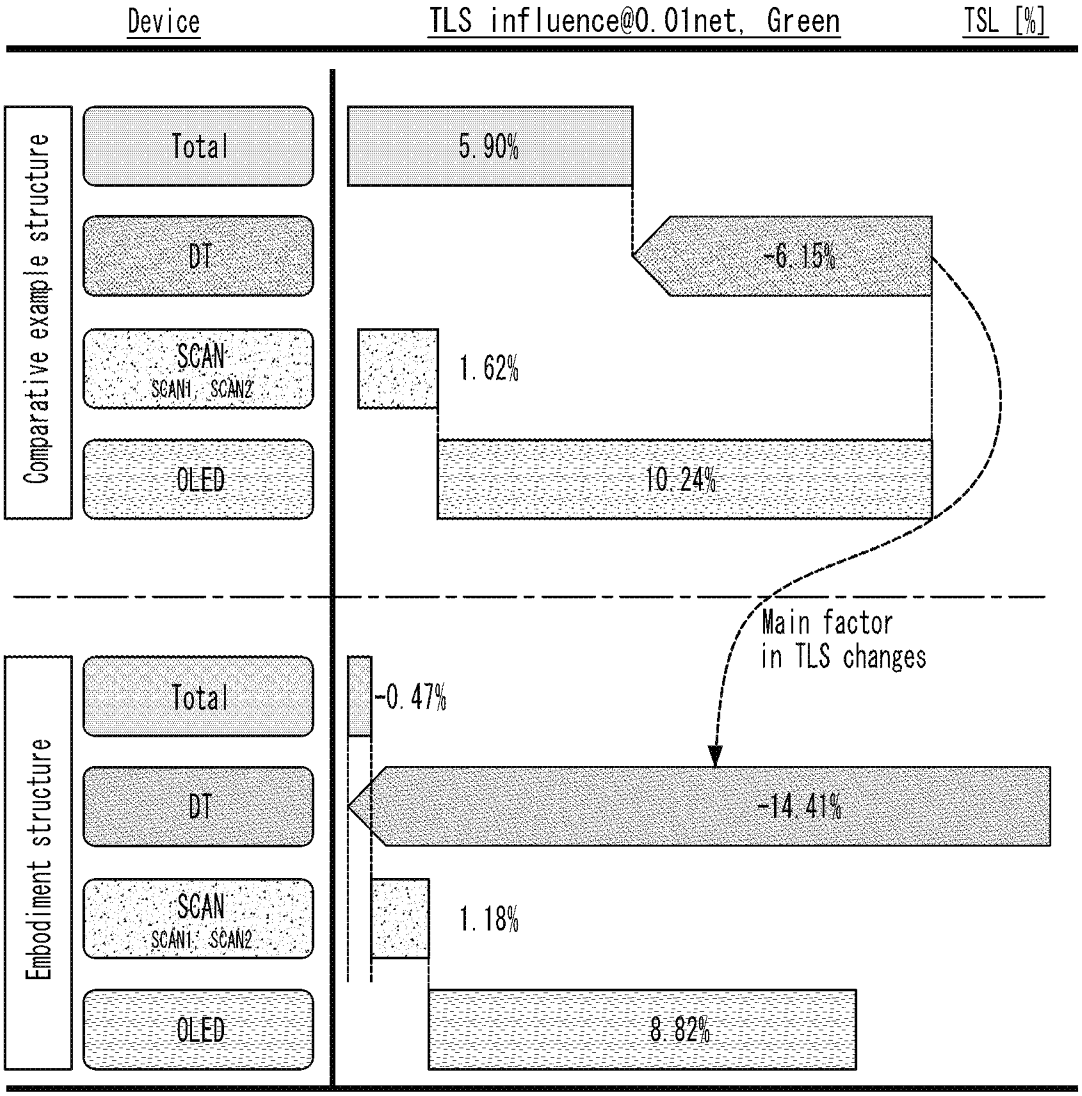
FIG. 27 is a diagram illustrating TLS influence on a display device implemented in a structure according to the embodiment and a display device implemented in a structure according to the comparative example.

FIG. 27 is a diagram illustrating TLS influence on a display device implemented in a structure according to the embodiment and a display device implemented in a structure according to a comparative example. FIG. 27 shows the TLS influence at 0.01 nit when the display panel emits green for the total device (Total), the driving transistor DT, scan signals SCAN1 and SCAN2, and the light-emitting diode OLED. As can be ascertained from FIG. 27, the display device implemented in the structure according to the embodiment can significantly alleviate/reduce the TLS influence compared to the display device implemented in the structure according to the comparative example.

The present disclosure has the effect of improving display quality and enhancing operation reliability and stability by improving the TLS influence caused by the mobility of a driving transistor. In addition, the present disclosure has the effect of improving or reducing mobility variation in driving transistors due to temperature change of a display panel and luminance variation caused by the mobility variation.

It will be apparent to those skilled in the art that various modifications and variations can be made in the present disclosure without departing from the spirit or scope of the present disclosure. Thus, it is intended that the present disclosure covers the modifications and variations of the present disclosure and their equivalents.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including subpixels for displaying an image; and a driver configured to drive the display panel, wherein each of the subpixels comprises:

a light-emitting diode configured to emit light;

a driving transistor configured to generate a driving current to be supplied to the light-emitting diode;

a compensation capacitor configured to store a first sampled value of the driving transistor for a first period of time based on a high-level voltage and a reference voltage;

a capacitor configured to store a second sampled value of the driving transistor for a second period of time based on the high-level voltage and the reference voltage, wherein a first electrode of the capacitor is directly connected to a gate of the driving transistor and a second electrode of the capacitor is directly connected to a second electrode of the driving transistor; and a compensation transistor configured to sum the first sampled value stored in the compensation capacitor and the second sampled value stored in the capacitor.

2. The display device of claim 1, wherein the first period of time is shorter than the second period of time.

3. The display device of claim 1, wherein the first sampled value includes a mobility of the driving transistor, and the second sampled value includes a threshold voltage of the driving transistor.

4. The display device of claim 1, wherein the compensation capacitor has a smaller capacitance than the capacitor.

5. The display device of claim 1, wherein a capacitance ratio between the capacitor and the compensation capacitor is in a range of 1:0.05 to 1:0.3, inclusive.

6. The display device of claim 1, wherein the subpixel is coupled to a data line through which a data voltage is transmitted, a reference voltage line through which the reference voltage is transmitted, an initialization voltage line through which an initialization voltage is transmitted, a high-level voltage line through which the high-level voltage is transmitted, and a low-level voltage line through which a low-level voltage is transmitted.

7. The display device of claim 1, wherein the subpixel comprises:

a first switching transistor having a gate electrode connected to a first scan line, a first electrode connected to a first data line, and a second electrode connected to a gate node of the driving transistor;

a second switching transistor having a gate electrode connected to a second scan line, a first electrode connected to the reference voltage line, and a second electrode connected to the gate node of the driving transistor;

a third switching transistor having a gate electrode connected to a third scan line, and a first electrode connected to the initialization voltage line;

the compensation transistor having a gate electrode connected to a fourth scan line, a first electrode connected to a second electrode of the compensation capacitor, and a second electrode connected to a source node of the driving transistor;

a first control transistor having a gate electrode connected to a first control line, a first electrode connected to the high-level voltage line, and a second electrode connected to a drain node of the driving transistor;

a second control transistor having a gate electrode connected to a second control line, a first electrode connected to the source node of the driving transistor, and a second electrode connected to an anode of the light-emitting diode;

the capacitor having a first electrode connected to the second electrode of the first switching transistor, the second electrode of the second switching transistor, the gate node of the driving transistor, and a first electrode of the compensation capacitor, and a second electrode connected to the source node of the driving transistor; and the compensation capacitor having the first electrode connected to the second electrode of the second switching transistor, the gate node of the driving transistor, and the first electrode of the capacitor, and the second electrode connected to the first electrode of the compensation transistor.

8. A method of driving a display device, comprising:

a first initialization step of initializing a gate node and a source node of a driving transistor based on a reference voltage and an initialization voltage;

a first sampling step of storing a first sampled value of the driving transistor in a compensation capacitor for a first period of time based on a high-level voltage and the reference voltage;

a second initialization step of initializing the gate node and the source node of the driving transistor based on the reference voltage and the initialization voltage;

a second sampling step of storing a second sampled value of the driving transistor in a capacitor for a second period of time based on the high-level voltage and the reference voltage;

a data write step of summing the first sampled value stored in the compensation capacitor and the second sampled value stored in the capacitor and storing a data voltage in the capacitor;

a reset step of initializing the source node of the driving transistor and an anode of a light-emitting diode based on the initialization voltage; and an emission step of causing the light-emitting diode to emit light based on a driving current generated from the driving transistor.

9. The method of claim 8, wherein the first sampling step is shorter than the second sampling step.

10. The method of claim 8, wherein the first sampled value includes a mobility of the driving transistor, and the second sampled value includes a threshold voltage of the driving transistor.

11. The method of claim 8, wherein the compensation capacitor has a smaller capacitance than the capacitor.

12. The method of claim 8, wherein a capacitance ratio between the capacitor and the compensation capacitor is in a range of 1:0.05 to 1:0.3, inclusive.

* * * * *